US011336963B2

United States Patent
Dutta et al.

(10) Patent No.: US 11,336,963 B2
(45) Date of Patent: May 17, 2022

(54) METHOD AND APPARATUS FOR PLAYING A 360-DEGREE VIDEO

(71) Applicant: Samsung Electronics Co., Ltd., Suwon-si (KR)

(72) Inventors: Bhaskar Dutta, Noida (IN); Manoj Verma, Noida (IN); Rahul Jain, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/962,500

(22) PCT Filed: Nov. 26, 2018

(86) PCT No.: PCT/KR2018/014618
§ 371 (c)(1),
(2) Date: Jul. 15, 2020

(87) PCT Pub. No.: WO2019/139250
PCT Pub. Date: Jul. 18, 2019

(65) Prior Publication Data
US 2021/0092489 A1   Mar. 25, 2021

(30) Foreign Application Priority Data
Jan. 15, 2018 (IN) .............................. 201811001649

(51) Int. Cl.
H04N 21/218 (2011.01)
H04N 21/472 (2011.01)
(Continued)

(52) U.S. Cl.
CPC ..... *H04N 21/47217* (2013.01); *G11B 27/005* (2013.01); *H04N 5/23238* (2013.01); *H04N 13/117* (2018.05); *H04N 21/816* (2013.01)

(58) Field of Classification Search
None
See application file for complete search history.

(56) References Cited

U.S. PATENT DOCUMENTS

2015/0310113 A1* 10/2015 Yi .......................... G06F 16/285
707/706
2016/0314759 A1* 10/2016 Shin .................. H04M 1/72412
(Continued)

FOREIGN PATENT DOCUMENTS

WO   2016/027977 A1   2/2016

OTHER PUBLICATIONS

International Search Report dated Mar. 6, 2019 in connection with International Patent Application No. PCT/KR2018/014618, 3 pages.
(Continued)

*Primary Examiner* — Eileen M Adams

(57) ABSTRACT

According to an embodiment of the present disclosure, a method comprises playing, by the media player, a 360-degree video. The method further comprises recording, by the media player, one or more viewing angles corresponding to a user's viewing of the 360-degree video. Further, the method comprises detecting, by the media player, a video seek event to a seek point of the 360-degree video. The method further comprises playing, by the media player, the 360-degree video from the seek point according to a viewing angle determined based on at least one of (a) a recorded viewing angle and (b) a view mode.

16 Claims, 16 Drawing Sheets

(51) Int. Cl.
  *H04N 13/117* (2018.01)
  *G11B 27/00* (2006.01)
  *H04N 5/232* (2006.01)
  *H04N 21/81* (2011.01)

(56) References Cited

U.S. PATENT DOCUMENTS

2017/0104927 A1     4/2017  Mugavero et al.
2017/0195615 A1*    7/2017  Han .................... G06F 3/04883
2017/0272785 A1     9/2017  Jeong
2017/0332117 A1    11/2017  Haritaoglu et al.
2017/0339341 A1*   11/2017  Zhou .................... H04N 9/8205
2018/0052595 A1     2/2018  Parmar et al.

OTHER PUBLICATIONS

Written Opinion of the International Searching Authority dated Mar. 6, 2019 in connection with International Patent Application No. PCT/KR2018/014618, 9 pages.

* cited by examiner

[Fig. 1A]
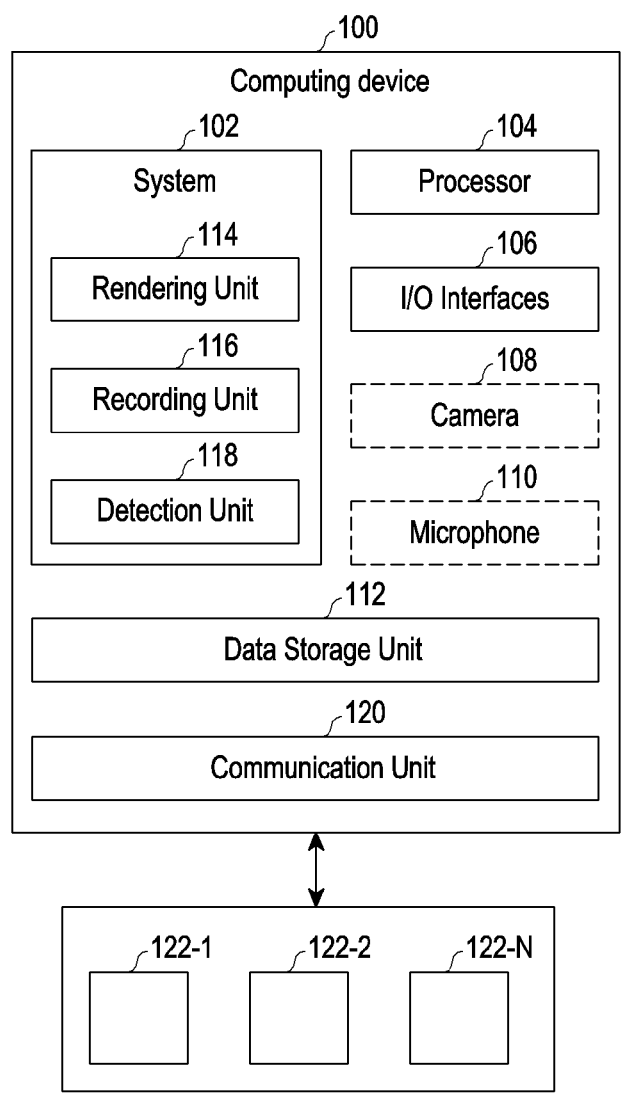

[Fig. 1B]
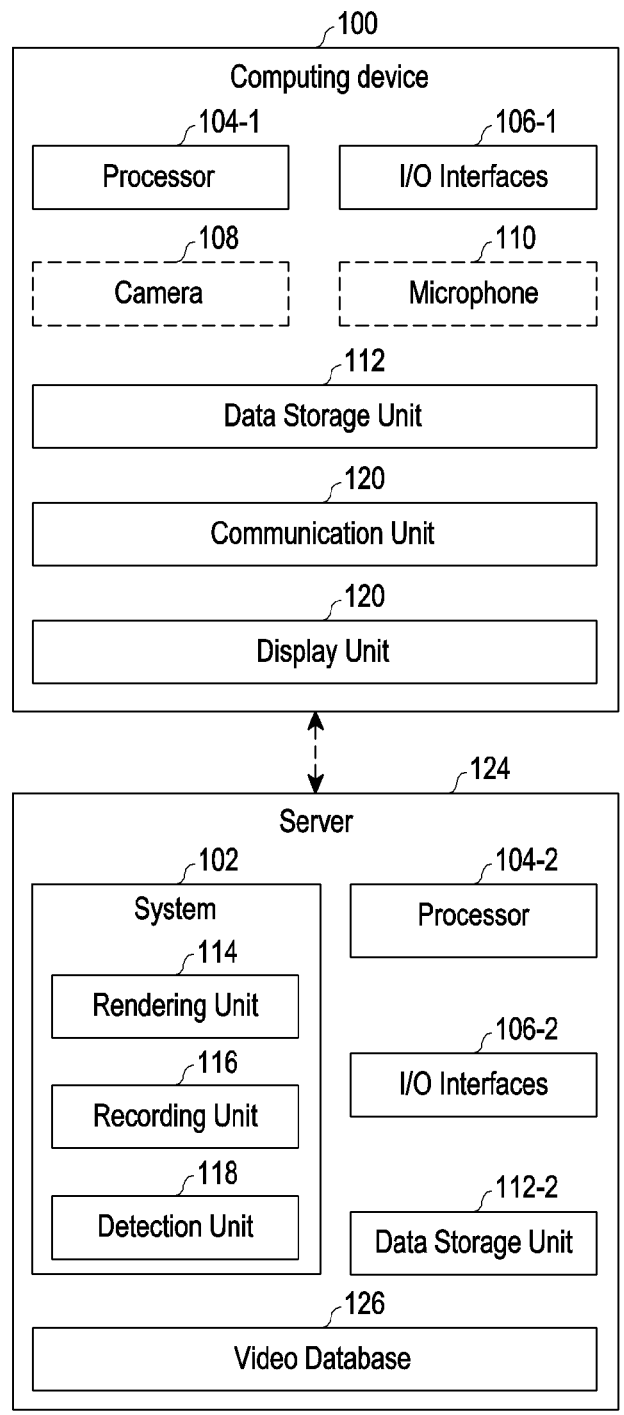

[Fig. 2]
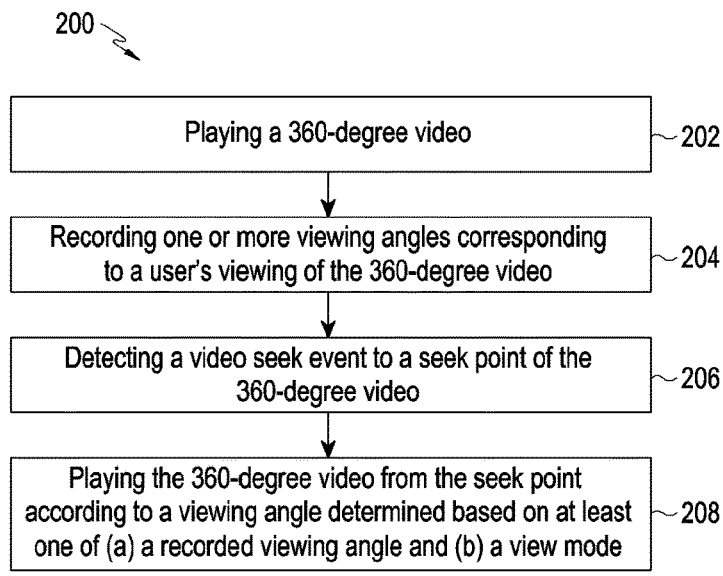
[Fig. 3]
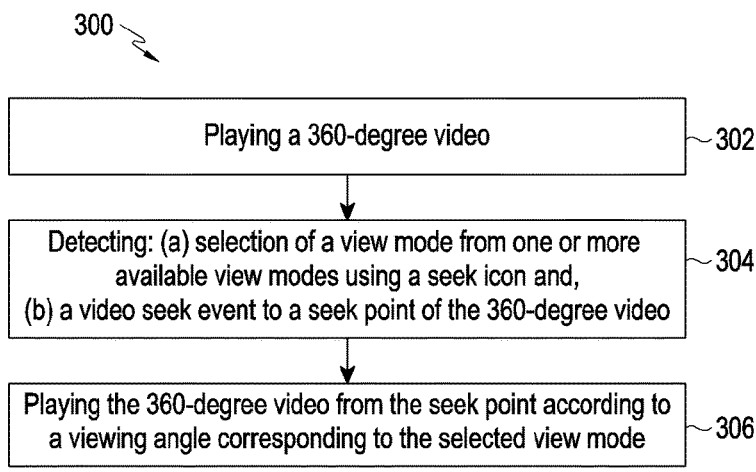
[Fig. 4]
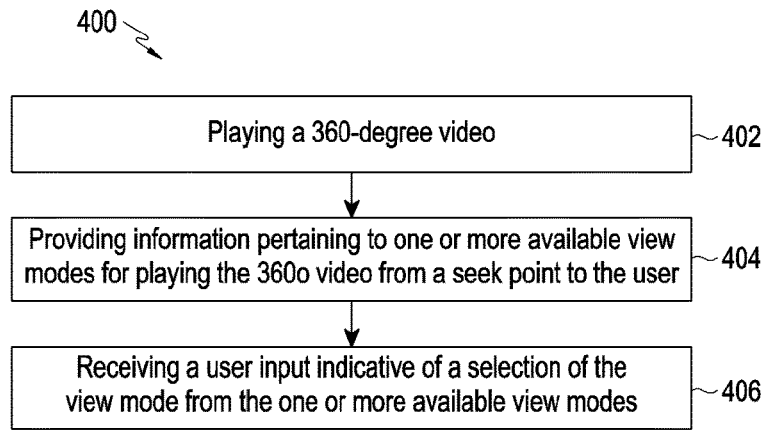

[Fig. 5]
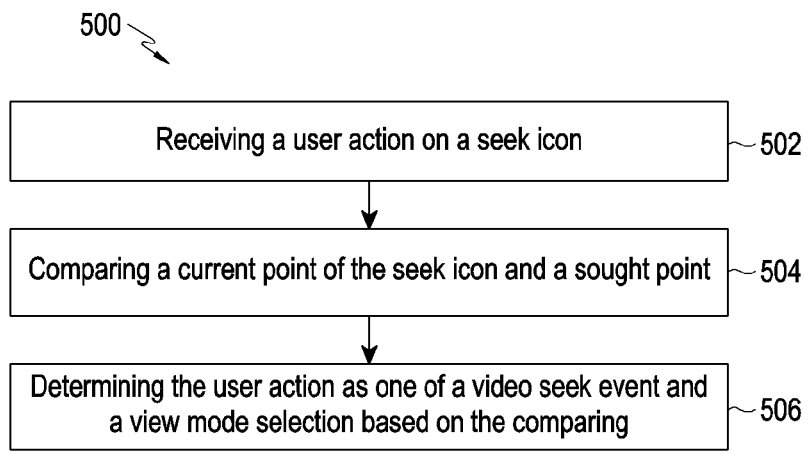
[Fig. 6A]
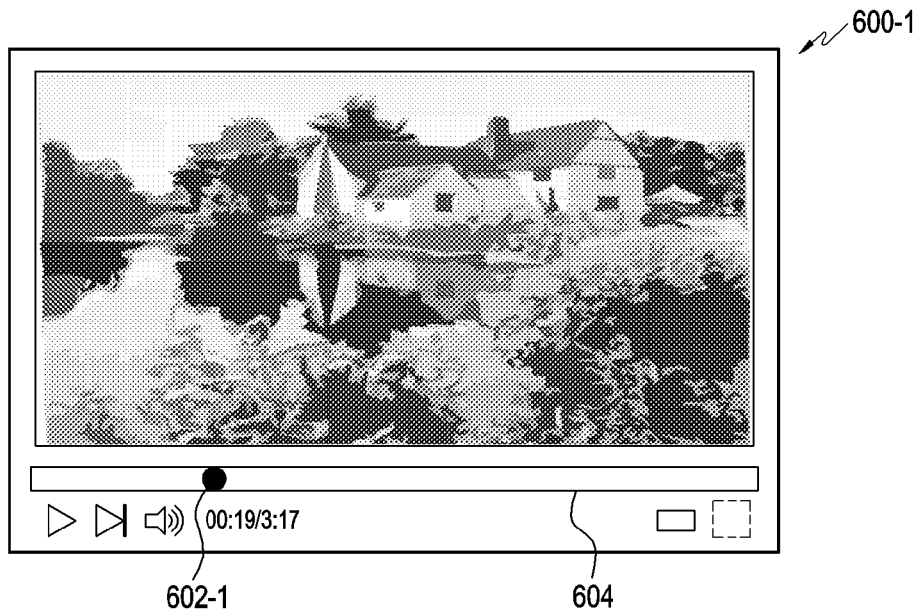

[Fig. 6B]
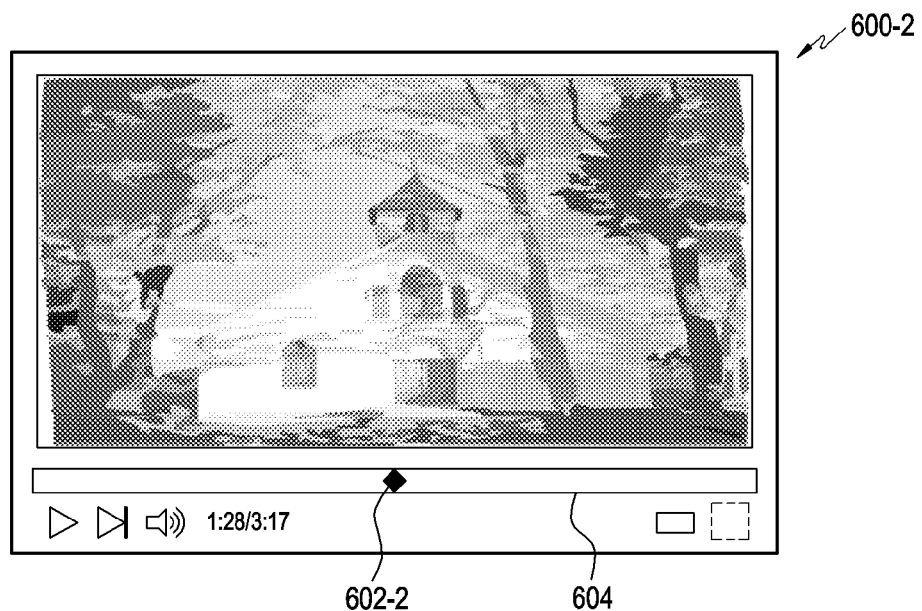
[Fig. 6C]
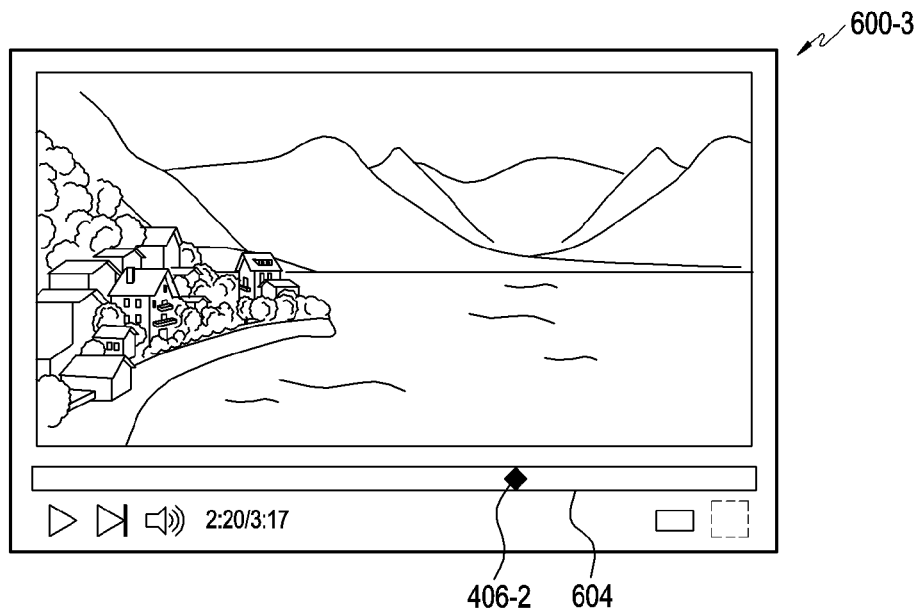

[Fig. 6D]
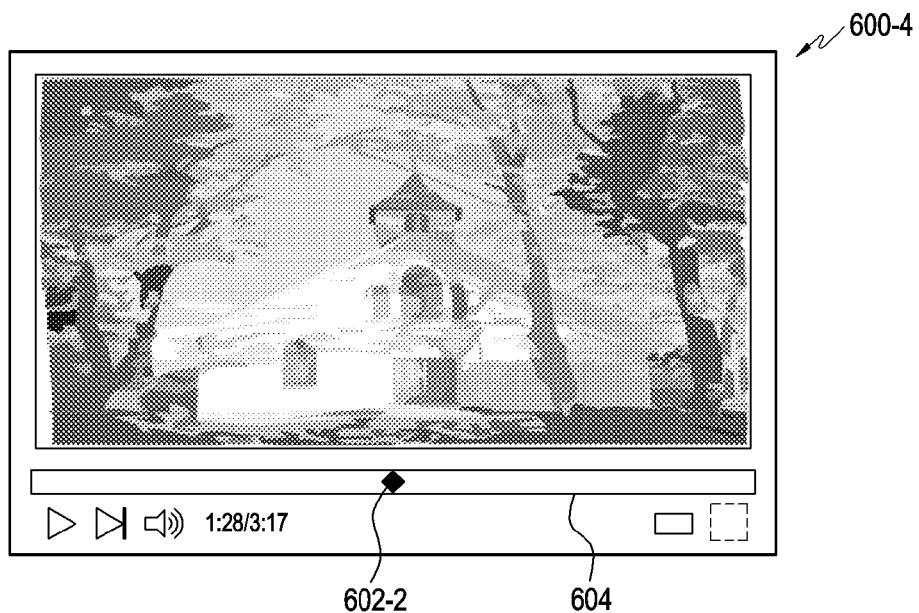
[Fig. 6E]
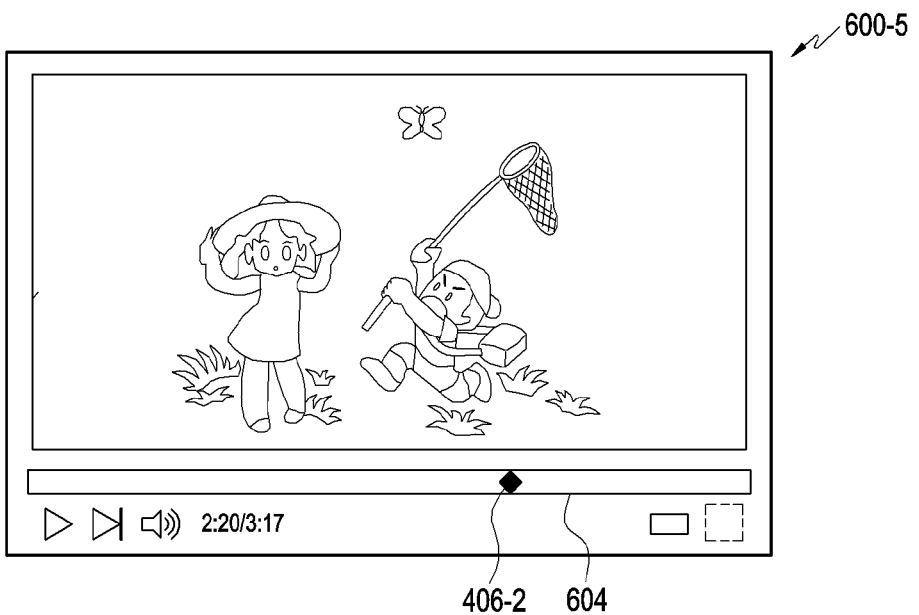

[Fig. 6F]
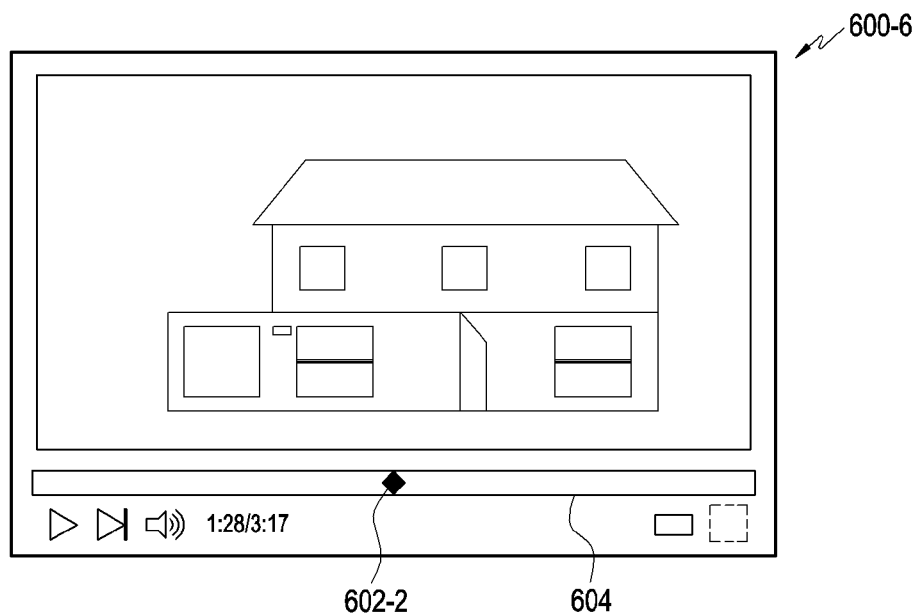
[Fig. 6G]
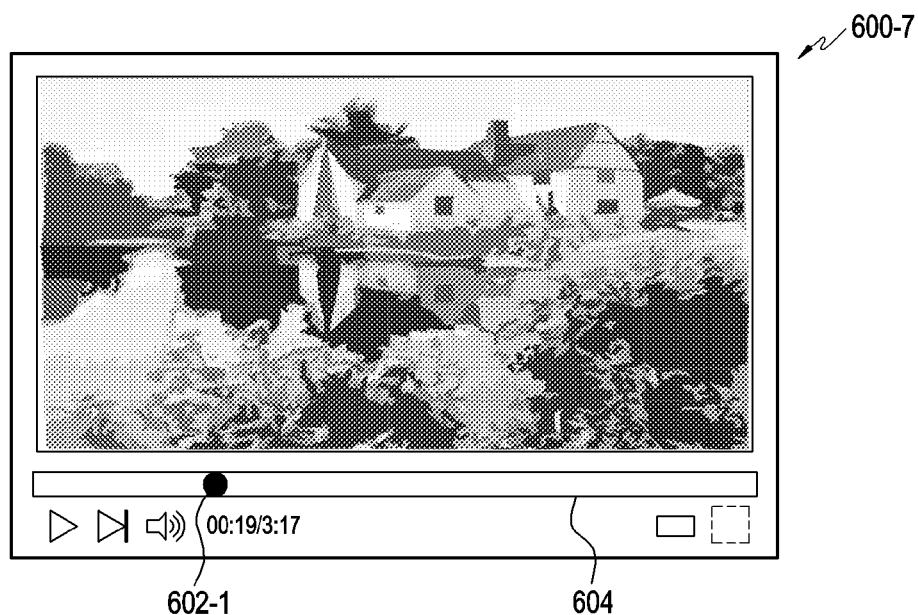

[Fig. 7]
| Views | Notation |
|---|---|
| Default View |  |
| User-1 view Icon |  |
| User-2 view Icon |  |
| User-1 Image Icon (image picked from social or local profile) |  |
| User-2 Image Icon (image picked from social or local profile) |  |
| DEFAULT view bubble icon |  |
| User-1 Bubble icon |  |
| User-2 Bubble icon |  |
| Multi USER view Icon |  |

[Fig. 8]
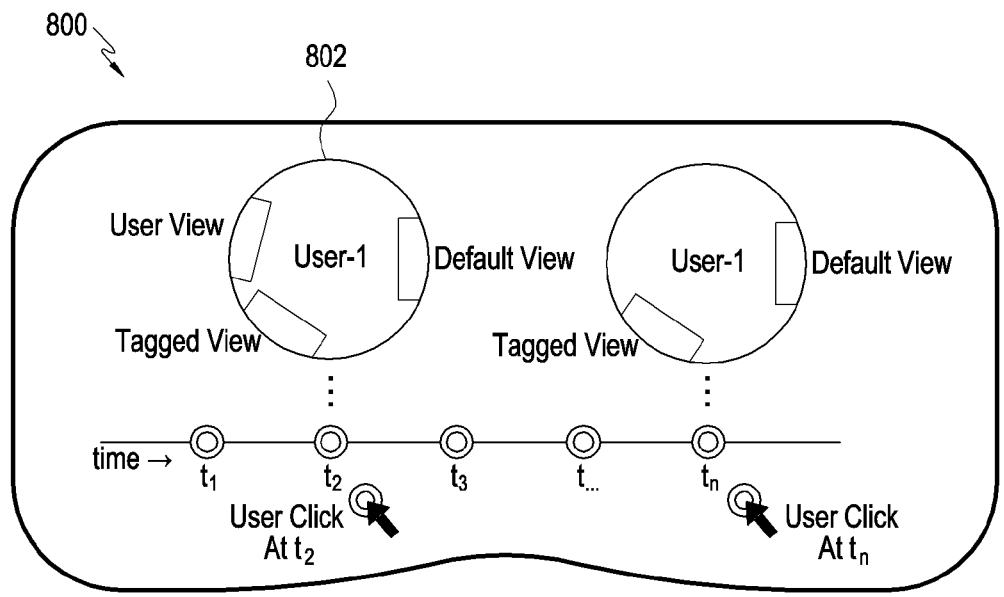
[Fig. 9]
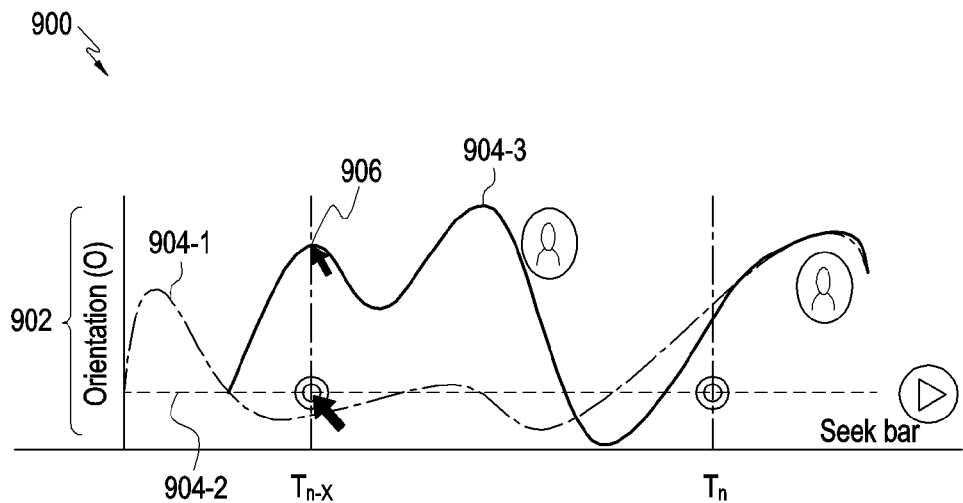

[Fig. 10]
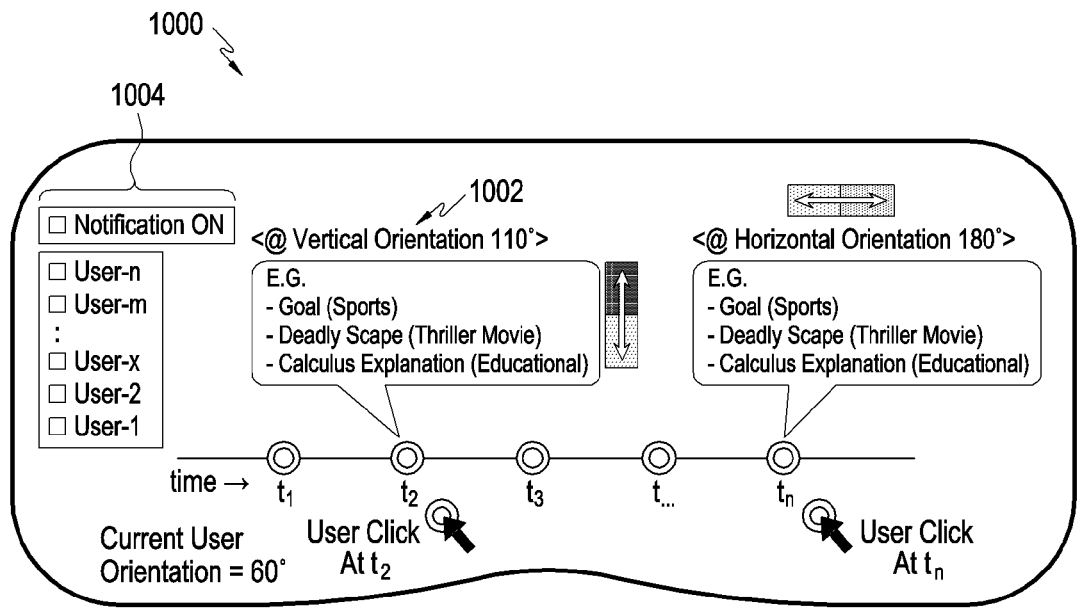
[Fig. 11]
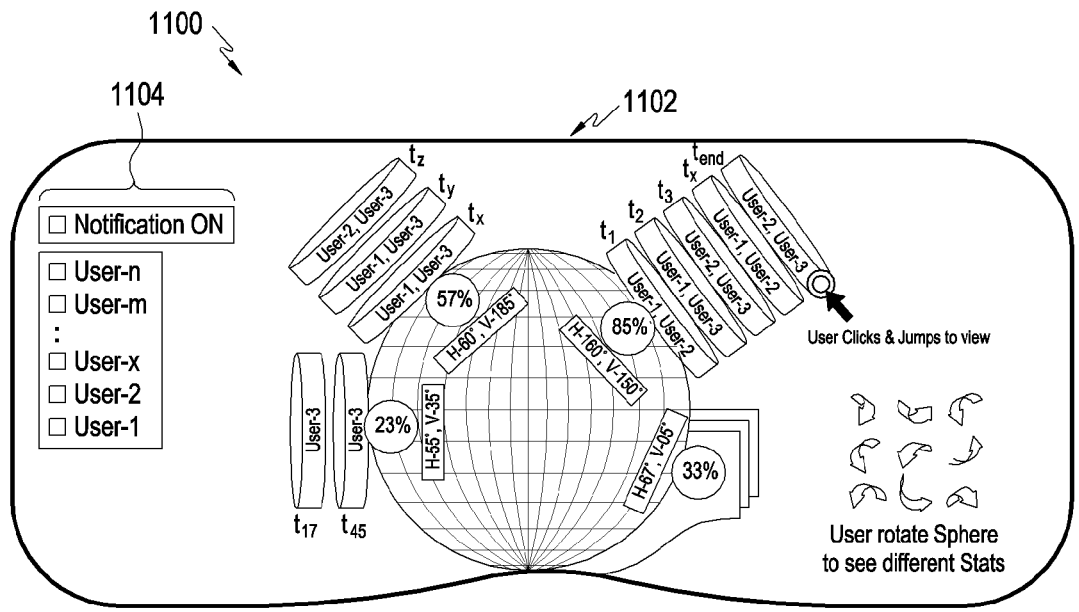

[Fig. 12]
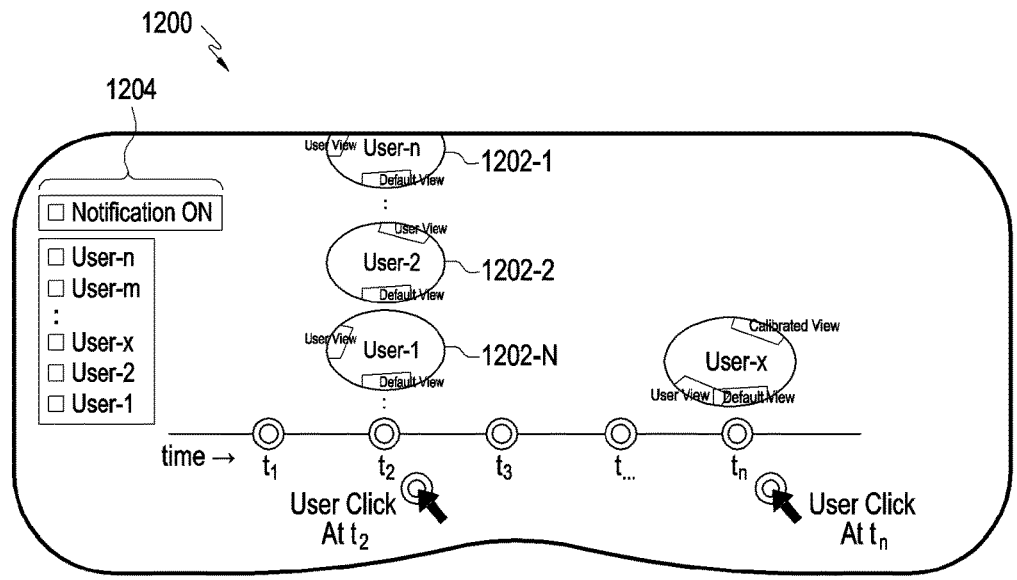
[Fig. 13]
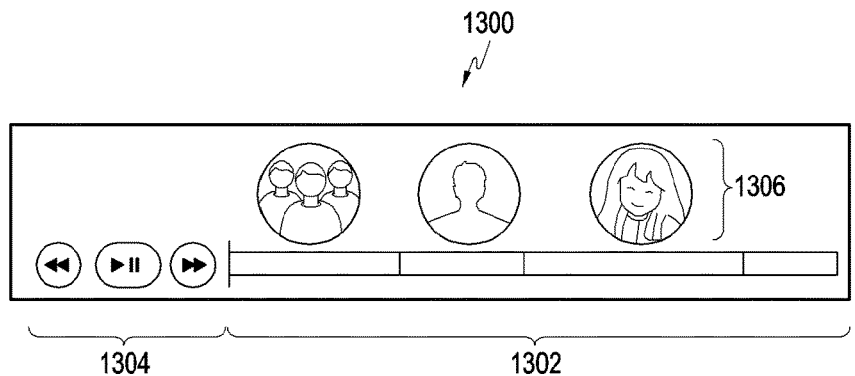
[Fig. 14]
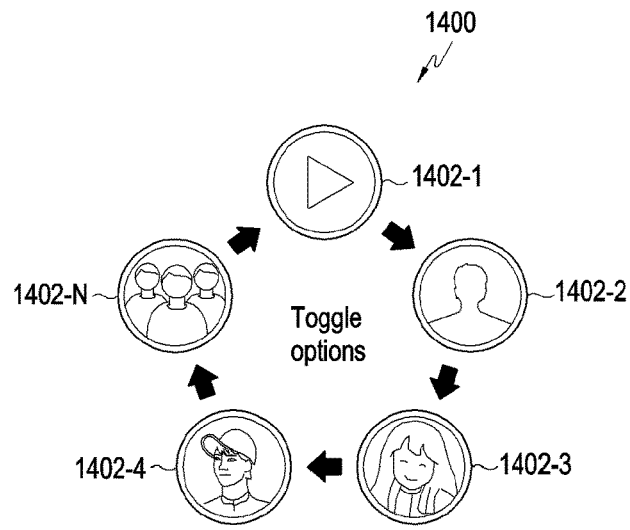

[Fig. 15]
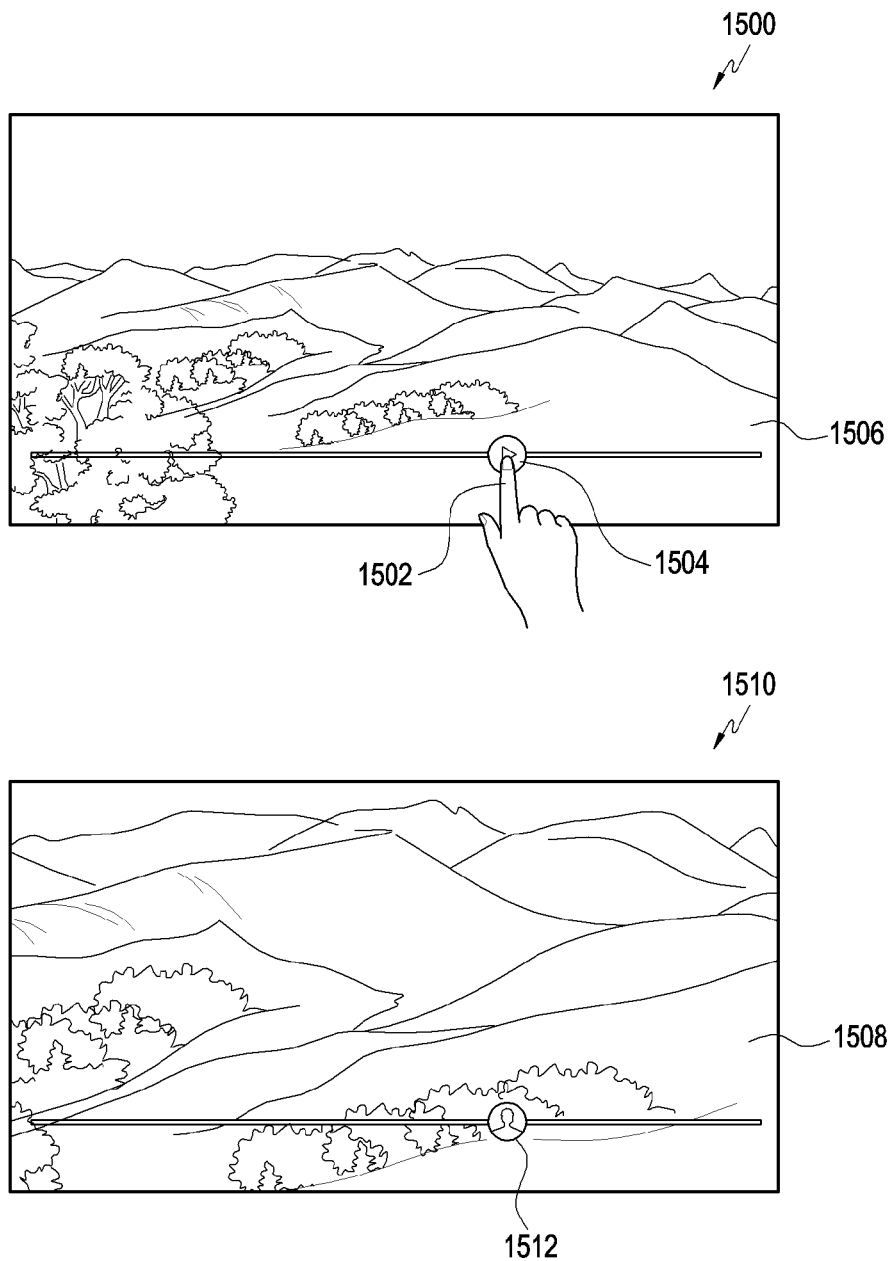

[Fig. 16]
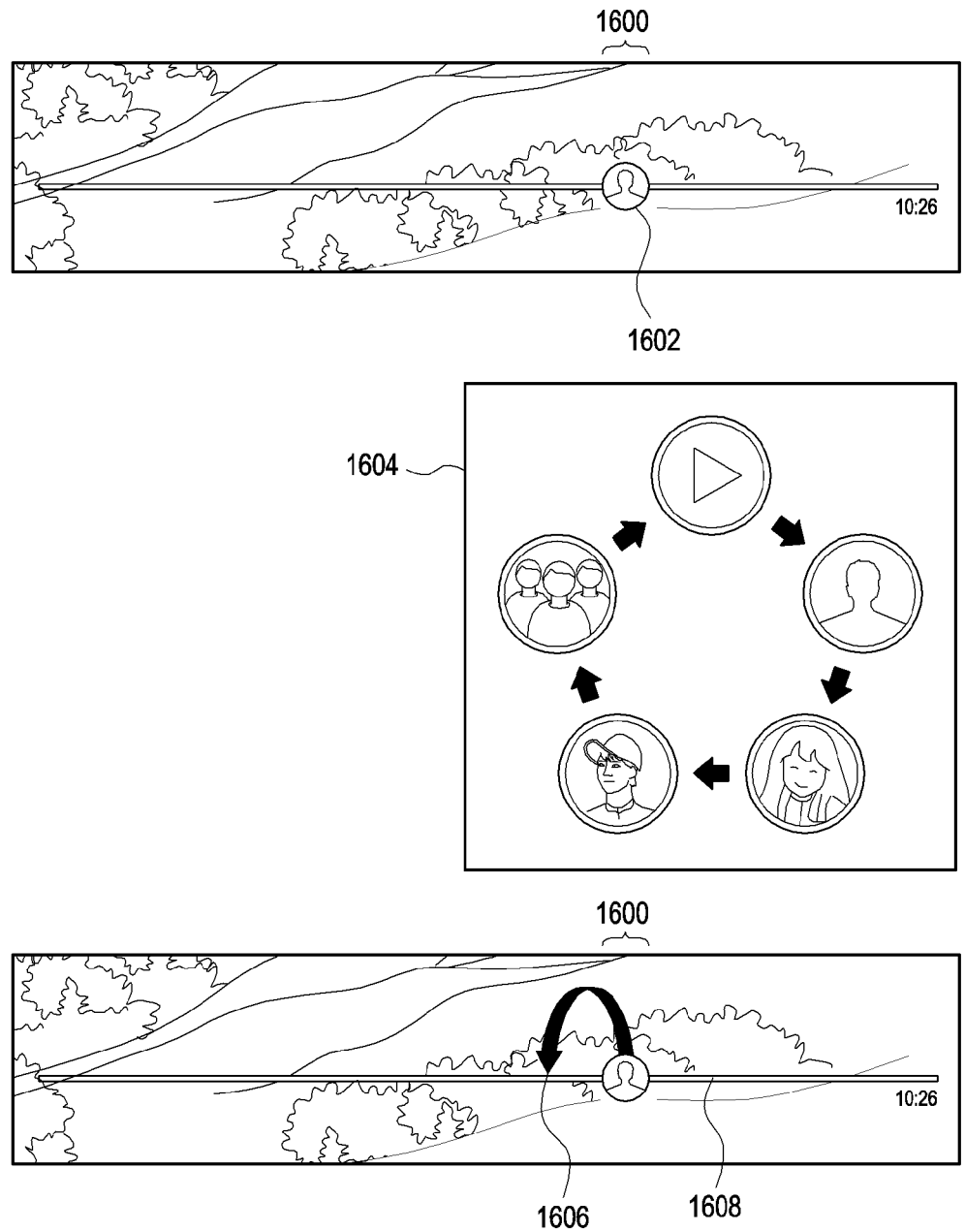

[Fig. 17]
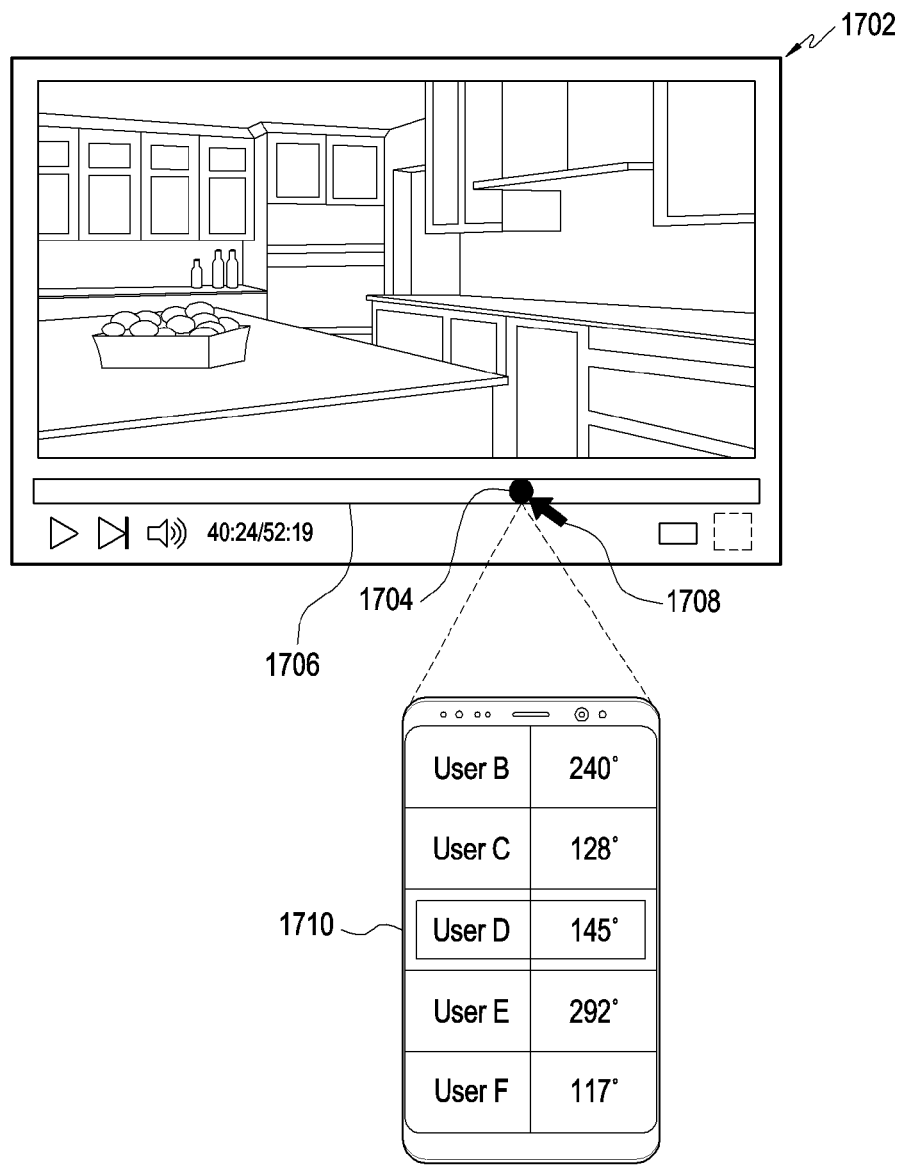

[Fig. 18]
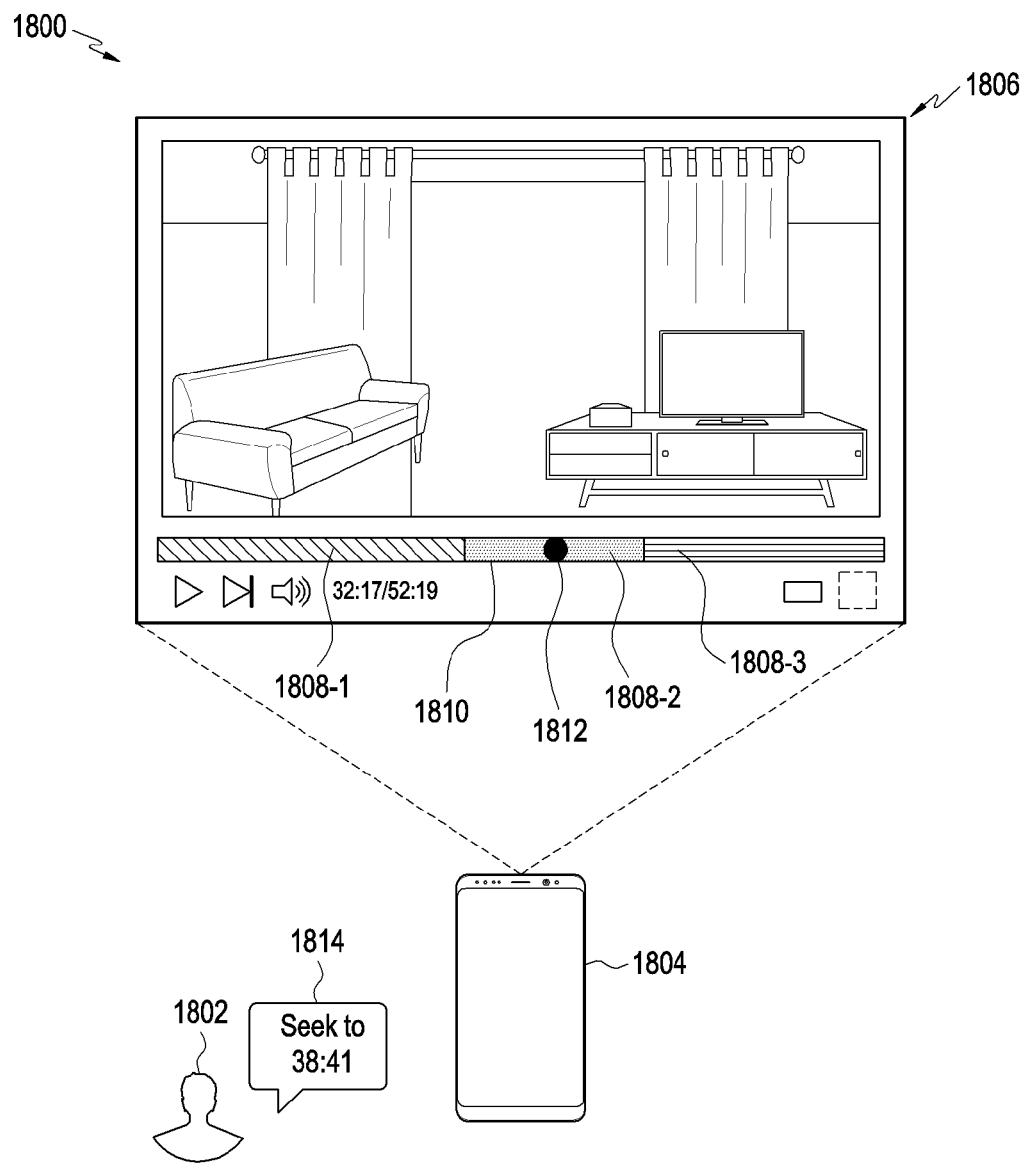

[Fig. 19]
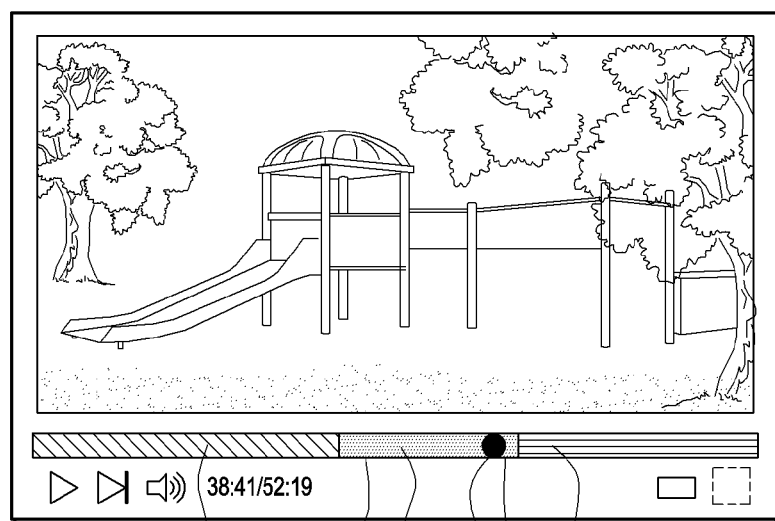

METHOD AND APPARATUS FOR PLAYING A 360-DEGREE VIDEO

CROSS-REFERENCE TO RELATED APPLICATIONS

This application is a 371 of International Application No. PCT/KR2018/014618 filed on Nov. 26, 2018, which claims priority to India Patent Application No. 201811001649 filed on Jan. 15, 2018, the disclosures of which are herein incorporated by reference in their entirety.

BACKGROUND

1. Field

The present disclosure relates to rendering digital content. More particular, the present disclosure relates to rendering 360-degree videos.

2. Description of Related Art

Immersive videos or 360-degree videos are growing in popularity. A 360-degree video contains different video frames with different viewing angle information, such as 0° (default and front view), +90° (right view), −90° (left view), +180° (back view), and −180° (back view). Such videos provide a wholesome viewing experience to the user by enabling the user to view the video in every direction.

Users typically view 360-degree videos using media players supporting 360-degree video playback. Such media players are provided on computing devices, such as smartphones, laptops, and tablets, as standalone applications or in an embedded form in a browser of the computing devices. A media player supporting 360-degree video playback renders a 360-degree video based on viewing angle information associated with the 360-degree video. During playback, the 360-degree video starts with the default view or as per a viewing angle/orientation of the user. The user, at any given instant, may change the viewing angle for enjoying a wholesome experience of watching the 360-degree video.

Aforementioned technique of rendering 360-degree videos involves various drawbacks. For instance, no auto view-calibration option is provided. If a user starts watching a 360-degree video in sleeping posture, the media player may, by default, change the viewing angle to a top direction (upwards from the front view), which may not be what the user desired.

Consider another case where a user enjoyed watching a 360-degree video, where the user had changed the viewing angle multiple times and/or may have liked certain segments of the 360-degree video. Now, if the user seeks to watch the 360-degree video again, current techniques of rendering 360-degree videos do not provide the user with an option to view the 360-degree video based on the user's previous viewing history.

In yet another case where a user may inadvertently change viewing angle during playback of a 360-degree video, current techniques do not provide the user with an option to reset his viewing angle to the previous viewing angle. Furthermore, the current techniques do not provide the user with an option to switch between a current viewing angle and the default-viewing angle thus, making it difficult to switch to the default view, as and when desired.

In yet another case, as information related to other user's viewing of the 360-degree video is absent, the user is not able to watch the 360-degree video as per other users', for example, family members, viewing angles or is unaware of the most viewed angles related to the 360-degree video. Thus, the user's experience of watching the 360-degree video is limited.

Thus, there exists a need for a solution to overcome at least one of the aforementioned deficiencies.

The above information is presented as background information only to assist with an understanding of the present disclosure. No determination has been made, and no assertion is made, as to whether any of the above might be applicable as prior art with regard to the present disclosure.

The present disclosure has been made to address at least the above problems and/or disadvantages and to provide at least the advantages described below. Accordingly, an aspect of the present disclosure is to provide a method and device for managing wireless connection in a wireless communication system. The technical solution of the present disclosure includes the following.

An aspect of the present disclosure is to provide a method and an apparatus for playing a 360-degree video.

SUMMARY

In an embodiment of the present disclosure, a method comprises playing, by the media player, a 360-degree video. The method further comprises recording, by the media player, one or more viewing angles corresponding to a user's viewing of the 360-degree video. Further, the method comprises detecting, by the media player, a video seek event to a seek point of the 360-degree video. The method further comprises playing, by the media player, the 360-degree video from the seek point according to a viewing angle determined based on at least one of (a) a recorded viewing angle and (b) a view mode.

In an embodiment of the present disclosure, an apparatus for playing a 360-degree is disclosed. The apparatus comprises a rendering unit to play a 360-degree video. The apparatus further comprises a recording unit to record one or more viewing angles corresponding to a user's viewing of the 360-degree video. Further, the apparatus comprises a detection unit to detect a video seek event to a seek point of the 360-degree video, where the rendering unit further is to play the 360-degree video from the seek point according to a viewing angle determined based on at least one of (a) a recorded viewing angle and (b) a view mode.

In an embodiment of the present disclosure, a method comprises playing, by a media player, a 360-degree video. The method further comprises detecting, by the media player, (a) selection of a view mode from one or more available view modes using a seek icon and, (b) a video seek event to a seek point of the 360-degree video. Further, the method comprises playing, by the media player, the 360-degree video from the seek point according to a viewing angle corresponding to the selected view mode.

In an embodiment of the present disclosure, an apparatus for playing a 360-degree is disclosed. The apparatus comprises a rendering unit to play a 360-degree video. The apparatus further comprises a detection unit to detect: (a) selection of a view mode from one or more available view modes using a seek icon and, (b) a video seek event to a seek point of the 360-degree video. The rendering unit further is to play the 360-degree video from the seek point according to a viewing angle corresponding to the selected view mode.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of certain embodiments of the present disclosure will be more apparent from following detailed description taken in conjunction with the drawings, wherein:

FIG. 1A illustrates a computing device including a system for rendering 360-degree videos, according to embodiments of the present disclosure;

FIG. 1B illustrates implementation of a system for rendering 360-degree videos, according to embodiments of the present disclosure;

FIG. 2 illustrates an exemplary method for rendering 360-degree videos, according to an embodiment of the present disclosure;

FIG. 3 illustrates an exemplary method for rendering 360-degree videos, according to an embodiment of the present disclosure;

FIG. 4 illustrates an exemplary method for rendering 360-degree videos, according to an embodiment of the present disclosure;

FIG. 5 illustrates an exemplary method for rendering 360-degree videos, according to an embodiment of the present disclosure;

FIGS. 6A-6G illustrate video frames of a 360-degree video according to an embodiment of the present disclosure;

FIG. 7 illustrates a plurality of view modes and corresponding notations, according to an embodiment of the present disclosure;

FIG. 8 illustrates a use case in accordance with an embodiment of the present disclosure;

FIG. 9 illustrates a use case in accordance with an embodiment of the present disclosure;

FIG. 10 illustrates a use case in accordance with an embodiment of the present disclosure;

FIG. 11 illustrates a use case in accordance with an embodiment of the present disclosure;

FIG. 12 illustrates a use case in accordance with an embodiment of the present disclosure;

FIG. 13 illustrates a graphical user interface (GUI) of a seek bar according to an embodiment of the present disclosure;

FIG. 14 illustrates a drop-down menu according to an embodiment of the present disclosure;

FIG. 15 illustrates a use case in accordance with an embodiment of the present disclosure;

FIG. 16 illustrates user activity of a user for playing a 360-degree video in accordance with an embodiment of the present disclosure; and FIG. 17 illustrates a use case in accordance with an embodiment of the present disclosure;

FIG. 18 illustrates a use case in accordance with an embodiment of the present disclosure; and FIG. 19 illustrates a use case in accordance with an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

The present subject matter describes systems and methods for playing 360-degree videos. According to aspects of the present subject matter, when a user watches a 360-degree video, one or more viewing angles in which the user has watched the 360-degree video are recorded. The recorded viewing angles are subsequently used to provide multiple options to the user for viewing the 360-degree video. In an example, the viewing angles are recorded as per three-axis coordinate system. That is, an angle along each of the x-axis, y-axis, and z-axis is recorded.

By way of example, suppose a user A starts watching a ten-minute long 360-degree video, hereinafter referred to as video A in said example, in a default view mode, i.e., as per a default viewing angle of the video A. Now, while watching the video A, at 2nd minute the user A may change his viewing angle. By virtue of change in the viewing angle, the viewing angle changes from default to +127-degree, +111 degree, +281 degree. At this time instant, the view angle change is recorded. Recording of the view angle change includes recording the current viewing angle and a time at which the user A switches to the current viewing angle. Thus, it is recorded that at time instant 2 minute, the viewing angle of the user A is +127-degree, +111 degree, +281 degree. Now, suppose the user A continues to watch the movie with viewing angle +127-degree, +111 degree, +281 degree until 5th minute. At 5th minute, the user A again changes his viewing angle. By virtue of change in the viewing angle, the viewing angle changes from +127-degree, +111 degree, +281 degree to −160-degree, −57 degree, −121 degree. At this instant, it is recorded that the current viewing angle is −160-degree, −57 degree, −121 degree and the time of view angle change is the 5th minute. Thereafter, the user A continues to watch the video A until the end with the viewing angle −160-degree, −57 degree, −121 degree.

In an example, besides recording the viewing angles in which the user A has watched the video A, metadata associated with the video A may also be recorded. In an example, the metadata includes a date of viewing of the video A, a session identity (ID) related to the viewing of the video A, and a type of a view mode in which the user A has watched the video A. As may be understood, other information may also be included in the metadata. An example database 1, illustrating the recording of the viewing angles and the metadata is reproduced below.

Example Database 1

| | Video A | | | |
|---|---|---|---|---|
| | Viewing Angle | | Metadata | |
| Time | of User A (x-y-z coordinates) | Date | Session ID | View Mode |
| 0:00 | 0 degree, 0 degree, 0 degree | Oct. 2, 2017 | S1 | Default mode |
| 2:00 | +127-degree, +111 degree, +281 degree | Oct. 2, 2017 | S1 | User seek mode |
| 5:00 | −160-degree, −57 degree, −121 degree | Oct. 2, 2017 | S1 | User seek mode |
| 10:00 | −160-degree, −57 degree, −121 degree | Oct. 2, 2017 | S1 | User Seek mode |

As shown in the above example database 1, the user A watches the complete video A in a single session S1. Further, the user A watches the video A in a default mode from start until 2nd minute. Thereafter, the user A watches the video A in user seek mode until the end of the video. The different view modes are described below.

According to aspects of the present subject matter, the view mode may be understood as a mode of viewing the 360-degree video. In an example, the view mode may be a default view mode. The default view mode may be understood as a view mode in which a 360-degree video is played as per a default viewing angle in which the 360-degree was recorded. That is, the user does not change the viewing angle throughout the playing of the video.

In another example, the view mode may be a user-replay view mode. The user-replay view mode may be understood as a view mode where the 360-degree video is played in a manner identical to a manner in which the 360-video was previously viewed by the user. As an example, during a first viewing of a 360-degree video, which is, say, five minutes long, the user may perform various actions in respect of the 360-degree video. For instance, the user may seek the 360-degree video to 3 minutes after 15 seconds of viewing the 360-degree video. Further, from the 3rd minute, the user may watch the 360-degree video until 3 minutes and 25 seconds and, may again seek to 2nd minute of the 360-video. From the 2nd minute, the user may watch the 360-video until the end. Now, in future, when the user selects to view the 360-degree video in the user-replay view mode, the 360-degree video will be played in a manner as described above.

In yet another example, the view mode may be a user seek mode. The user seek mode may be understood as a view mode where the 360-degree video is played based on the recorded angle corresponding to the user's viewing of the 360-degree video. In an example, the recorded angle may correspond to a current viewing of the 360-degree video. In another example, the recorded angle may correspond to a previous viewing of the 360-degree video by the user.

In yet another example, the view mode may be a different user seek mode. The different user seek mode may be understood as a view mode where the 360-degree video is played based on recorded viewing angles corresponding to a further user. In other examples, as will be described later, the user may choose to view the 360-degree video as per any of a trending view mode, a most viewed mode, and an interest-based view mode.

According to further aspects of the present subject matter, multiple options of viewing a 360-degree video are presented to the user using a seek icon of a media player through which the user is viewing the video. Using the seek icon, the user may select any of the available view modes for watching the 360-degree video as per the selected view mode. Providing of multiple options using the seek icon enhances the user experience of watching the 360-degree video. For instance, the user can easily change between different available view modes using a single click on the seek icon.

According to further aspects of the present subject matter, a video seek event (interchangeably referred to as seek event) to a seek point of the 360-degree video may be detected. In an example, the selection of the view mode occurs prior to the video seek event. That is, the user at first selects the view mode and then seeks to a seek point. In another example, the selection of the view mode occurs after the video seek event. That is, the user at first performs the seek to the seek point and then multiple options related to available view modes are provided to the user. Based on at least one of the recorded viewing angle and view mode, the 360-degree video is played from the seek point.

According to an aspect of the present subject matter, the user A may again watch the video A. Now, when the user watches the video A, the user A may be presented with multiple options of viewing the video A. For instance, the user A may start playing the video A and may straightaway seek to a seek point corresponding to time 2:30 minute. Now, example database 1 is queried to ascertain whether any view modes are available corresponding to the aforementioned time. Based on the ascertaining, it is learnt that user seek mode corresponding to the user A's previous viewing session (s1) is available. Now, after the user seeks to the aforementioned time, an option may be provided to the user A for viewing the video A either in the default view mode or as per the user seek mode. In a case if the user A selects the option to view the video A as per the user seek mode, viewing angle corresponding to the 2:30 minute is fetched based on the example database 1. As can be seen from the example database 1, the viewing angle corresponding to the aforementioned time is +127-degree, +111 degree, +281 degree. Thus, the user A is viewing angle is changed to +127-degree, +111 degree, +281 degree and the video is played as per the aforementioned viewing angle.

According to further aspects of the present subject matter, multiple options of viewing the 360-degree may be provided to the user on a seek bar of the media player through which the user is watching the 360-degree video. By way of example, different colors corresponding to different view modes may be provided on the seek bar. In another example, a profile picture or a thumbnail corresponding to the different modes may be presented to the user. Accordingly, the user may select a view mode from the available view modes. Providing the available view modes on the seek bar enhances the user experience with respect to viewing of the 360-degree video. For instance, the user may easily view the multiple viewing options available with respect to the 360-degree video. Subsequently, the user may easily select any of the available view modes.

As may be gathered, recording of the viewing angles provides the user with various options for playing the 360-degree video. For instance, a user may choose to view the video in the user-replay view mode or may choose to view the video based on a different user seek mode, or in other view modes as described above. Further concepts and advantages of the present subject matter are described below.

Embodiments of the present invention are described below in detail with reference to the accompanying drawings.

FIG. 1A illustrates a computing device 100 implementing a system 102 for rendering 360-degree videos to users, according to embodiments of the present disclosure. Examples of the computing device 100 may include, but are not limited to, a laptop, a smartphone, a desktop computer, a workstation computer, a virtual reality (VR) headset, and the like.

In an example, a user may watch 360-degree videos using a media player provided on the computing device 100. In an example, the media player may be provided as a standalone application. In another example, the media player may be in an embedded form in a browser application of the computing device 100. Further, the 360-degree videos may be stored on the computing device 100, in an example. In another example, the computing device 100 may receive a video feed of the 360-degree videos from a server of a video service provider.

In an example, the computing device 100 may include the system 102, a processor 104, I/O interfaces 106, a camera 108 (optional), a microphone 110 (optional), and a storage unit 112.

The system 102 includes a rendering unit 114, a recording unit 116, and a detection unit 118. The processor 104, the rendering unit 114, the recording unit 116, and the detection unit 118 may be implemented as, signal processor(s), state machine(s), logic circuitries, and/or any other device or component that manipulate signals based on operational instructions. Further, the processor 104, the rendering unit 114, the recording unit 116, and the detection unit 118 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor, which executes instructions to perform required tasks, or, the processing unit can be dedicated to perform the required functions. In another example, the processor 104, the rendering unit 114, the recording unit 116, and the detection unit 118 may be machine-readable instructions (software) which, when executed by a processor/processing unit, perform any of the described functionalities.

The I/O interfaces 106 may include a variety of software and hardware interfaces, for example, interfaces for peripheral device(s), such as a wired headset device, a wireless headset device, a keyboard, a mouse, a display unit, an external memory, and a printer. The I/O interfaces 106 can facilitate multiple communications within a wide variety of networks and protocol types, including wired networks and wireless networks. For the purpose, the I/O interfaces 106 include one or more ports for connecting to the peripheral device(s). The camera 108 and the microphone 110 are adapted to receive user inputs, such as user gestures and voice commands, respectively.

The data storage unit 112 may be a repository/storage medium/data store, for storing data processed, received, and generated by one or more of the processor 104, the rendering unit 114, the recording unit 116, and the detection unit 118. Further, the data storage unit 112 may be used for storing the 360-degree videos (received from the server of the video service provider, in an example).

As mentioned above, the user may watch 360-degree videos using the computing device 100. To that end, the computing device 100 may receive a selection of a 360-degree video from the user. In an example, the selection of the 360-degree video may be received using a user input that may be one of a voice command, a user gesture, or a selection through a peripheral device, such as a mouse or a keyboard. As may be understood, the voice command may be received using the microphone 110, the user gesture may be received using the camera 108, and the input from the peripheral devices may be received using the I/O interfaces 106.

In an example, on receiving the selection, the rendering unit 114 plays the 360-degree video. In an example, the rendering unit 114 starts playing the 360-degree video from a default viewing angle. In another example, where the user was previously watching the 360-degree video and had paused the same, the rendering unit 114 starts playing the 360-degree video from a last viewing angle in which the user was watching the 360-degree video. As may be understood, while watching the 360-degree video, the user may change his/her viewing angle multiple times to view the 360-degree video from different directions. Accordingly, in an example, the recording unit 116 records one or more viewing angles corresponding to the user's viewing of the 360-degree video. For instance, for a five-minute 360-degree video, the user may change viewing angles at 1 minute, 3 minute, and 4 minute. Accordingly, the recording unit 116 records the viewing angle and the time instances at which the viewing angles are changed. In another example, the recording unit 116 may record the viewing angle of the user at predefined times, for example, at the start of the 360-degree video, at the end of the 360-degree video, and after fixed time intervals. The recorded viewing angles, in an example, include information related to viewing angles of the user with respect to three-axis (x-y-z) coordinate system. In an example, the recorded viewing angles are stored in the data storage unit 112.

In an example, the recording unit 116 associates the recorded viewing angles with different view modes, as applicable, in which the 360-degree video may be rendered. For instance, the recorded viewing angles may be associated with a default view mode. In the default view mode, the user does not change his/her viewing angle while watching the 360-degree video and the 360-degree video plays as per predefined viewing angles. In such a case, the recorded viewing angles include the predefined viewing angles.

In another example, the recorded viewing angles may be associated with a user-replay view mode. In said view mode, besides the recorded viewing angles, user activity in respect of the 360-degree video is also recorded. For instance, seek actions, replay actions, zoom activity, and the like, performed by the user in respect of the 360-degree video is recorded. When the user seeks to play the 360-degree video in this mode, the 360-degree video is played in a manner identical to a manner in which the user had watched the 360-degree video previously. That is, while watching the 360-degree video in the user-replay view mode, the user activity as performed during a previous viewing session is repeated. In an example, a timestamp (including time and date) is also associated with the user-replay view mode. Thus, in cases where the user has watched the 360-degree video plurality of times previously, an option may be provided to the user for viewing the 360-degree videos in a manner as per any of the previous instances.

In another example, the recorded viewing angles may be associated with a user seek mode. The user seek mode is a view mode corresponding to the user's viewing of the 360-degree video. The user seek mode includes only the recorded viewing angles and does not include the user activity of the user. In an example, the user seek mode may correspond to a current viewing session of the viewer. Thus, in instances where the user may accidentally change the viewing angle, the user may use the user seek mode for resetting the viewing angle. In another example, the user seek mode may correspond to a previous viewing session of the user. Thus, the user may use the user seek mode to watch the 360-degree video as per a previous viewing session. In an example, a timestamp (including time and date) is also associated with the user seek mode. Thus, in cases where the user has watched the 360-degree video plurality of times previously, an option may be provided to the user for viewing the 360-degree videos in a manner as per any of the previous instances.

In yet another example, the recorded viewing angles may be associated with a different user seek mode. The different user seek mode may be understood as a view mode where the 360-degree video is played as per a viewing session of a further user. Consider an example where a user A has watched the 360-degree video. As mentioned above, the recording unit 116 records the viewing angles corresponding to a user's viewing of a 360-degree video. Thus, viewing angles for the user A is recorded. Now, if a user B happens to watch the 360-degree video, the user B may be provided with an option to view the 360-degree video as per the recorded viewing angles of the user A. Such a view mode is referred to as "different user seek mode".

In yet another example, the recorded viewing angles may be associated with an interest-based view mode. The interest-based view mode may be understood as a view mode where the 360-degree video is played as per the user's interest. In said example, based on the user's viewing activity with respect to one or more 360-degree videos, user interests or habits are learnt. For instance, it may be learnt that the user likes to watch monuments. Accordingly, when the user starts to watch a 360-degree video in the interest based video mode, a viewing angle of the user may be changed towards monuments, if present in the video frame of the 360-degree video. In another example, if a user A has selected his interest as "Animal" and has watched a 360-degree video with different direction, then as mentioned above, the recording unit 106 records the viewing angles corresponding to the user A's viewing of the 360-degree video. Now if a user B happens to watch the same 360 degree which has been already seen by user A, and if user B has same interest like "Animal", then an option may be provided to the user B to view the 360-degree video as per the recorded viewing angles of the user A.

In yet another example, the recorded viewing angles may be associated with a most viewed mode. The most viewed mode may be understood as a view mode in which a 360-degree video has been viewed a maximum number of times. The most viewed mode may be determined based on the recorded viewing angles associated with one or more users. Consider an example of a video service provider providing 360-degree videos. In said example, the video service provider may collect information related to the recording viewing angles of different users for a given 360-degree video. Accordingly, when a user, say user A, seeks to watch the 360-degree video, the user may be provided with an option of viewing the 360-degree video as per the most viewed mode. In a similar manner, in another example, the recorded viewing angles may be associated with a trending view mode. The trending view mode may be understood as a view mode in which the 360-degree video has been watched the maximum number of times in a given time period. As an example, for a given 360-degree video, the video service provider may determine the trending view mode based on the recorded viewing angles as recorded for a period of one month. In an example, the trending view mode may be different from the most viewed mode. In another example, the trending view mode may be same as the most view mode.

As may be understood, the view modes become available to the user as and when corresponding viewing angles are recorded. For instance, the different user seek mode becomes available when a further user has watched the 360-degree video. Similarly, the user-replay view mode becomes available after the user has watched the 360-degree video once. Thus, in accordance with the present subject matter, multiple options of viewing the 360-degree video as per different view modes are provided to the user.

In an example, besides recording the viewing angles, the recording unit 116 also records metadata associated with the 360-degree video that the user is watching. In an example, the metadata includes a date of viewing the 360-degree video. Based on the recorded dates, viewing options for viewing the 360-degree video are provided to the user along with time references. For instance, the user may have watched the video in the user seek mode multiple times, say, two days ago, four days ago, two weeks ago. Thus, while providing the user seek mode options to the user, aforementioned time references are also provided to the user. Thus, the user may select the user seek mode corresponding to any of the aforementioned time references.

The metadata may further include, a session ID associated with viewing of the 360-degree video. The session ID is indicative of a session in which the user has watched the 360-degree video. For instance, consider a case where the user watches a portion of the 360-degree video during a first viewing session, say, in the morning. Now, the user goes to office and comes back in the evening. The user may now decide to watch the 360-degree video. Now, when the user decides to watch the 360-degree video, it is recorded that the user is watching the 360-degree video in a second viewing session. In an example, besides the session ID, a time of viewing the 360-degree video may also be recorded.

The metadata may further include a type of the view mode in which the user is watching the 360-degree video. Accordingly, during subsequent playing of the 360-degree video, viewing options are provided to the user. Further, recording of the type of view mode enables providing an option to a different user to view the 360-degree video as per the view mode of the user. For instance, a user A watches the video in user seek mode and different viewing angle changes corresponding to the user A's watching of the 360-degree video are recorded. Now, when a user B decides to watch the 360-degree video, the user B is provided options to view the 360-degree video as per the view modes of the user A. Thus, as described, the metadata facilitates in providing different view modes to the user.

The metadata further includes user preferences learnt over time by the system 100. For instance, suppose a user A often watches action theme based 360-degree videos. In particular, in such 360-degree videos, the user repeatedly watches car chase scenes. Thus, by implementing machine learning algorithms, the system 100 learns that the user A is interested in action 360-degree videos and likes car chase scenes. Accordingly, in future, the system 100 is able to provide recommendations and notifications to the user A for watching such 360-degree videos.

In an example, the recording unit 116 stores the metadata in the data storage unit 112.

According to further aspects, multiple viewing options, i.e., the available view modes for viewing the 360-degree video are provided to the user on a seek icon or a seek bar of a media player through which the user is watching the 360-degree video based on the recorded metadata (explained later). By way of example, suppose a user A decides to watch a 360-degree video. Now, when the user starts playing the 360-degree video, the rendering unit 114 obtains the metadata from the data storage unit 112. Based on the metadata, the rendering unit 114 provides the user with multiple options of viewing the 360-degree video. For instance, based on the metadata associated with the video, the rendering unit 114 may determine that a different user seek mode, a most viewed mode, and a trending mode, is available. Accordingly, the rendering unit 114 may provide options to select the available view modes on at least one of the seek icon and the seek bar.

In an example, based on the metadata, the rendering unit 114 provides information pertaining to one or more available view modes for playing the 360-degree video to the user. The information provided may include a color corresponding to the view mode. For instance, when playing the 360-degree video, if the user seek mode is available for a portion of the 360-degree video, the rendering unit 114 may highlight that portion of the 360-degree video using a first color. For another portion, if the different user seek mode is available, the rendering unit 114 may highlight that portion using a second color. Furthermore, for a portion of the 360-degree video where different user seek mode is available for multiple users or where most viewed mode is available or trending mode is available, the rendering unit 114 may highlight the portion using a third color. The information may further include icons or thumbnails for different view modes. Also, in addition to the icons or thumbnails, a picture of the user or the different user may be provided to the user. In an example, the picture may be fetched from a social profile or a local registered profile of the user. In said example, a communication unit 120 of the computing device 100 may communicate with one or more social media databases 122-1 to 122-N for obtaining the picture of the user. Further, the information may include a name of the user or a name of the different user.

Furthermore, the information may include a timestamp associated with the view mode. For instance, the system 100 may have two instances of user seek mode available for providing to the user. In said case, the rendering unit 114 provides a timestamp along with the user seek mode to the user. Thus, the user may decide based on the timestamp, a particular user seek mode which he wants to view.

Further, the information may include viewing angle information associated with the user's viewing of the 360-degree video. For instance, for a user a, b, and c, information as to their corresponding viewing angle with respect to the viewing of the 360-degree video is available for providing to the user. Thus, when a user points a mouse pointer to a particular time frame on the seek bar where multiple users have viewed the 360-degree video, information related to their corresponding viewing angles may be displayed. Furthermore, in an example, the information may include notifications related to the 360-degree video. The notifications, in an example, may include one or more tags saved by the user during viewing of the 360-degree video. In an example, at least a portion of the aforementioned may serve as indicators. For instance, the color, the icon(s), the thumbnail(s), and the picture(s) may serve as indicators.

In an example, the rendering unit 114 may receive a user request to generate an analysis report for the 360-degree video. In an example, the user request is received as a user input that may be one of a voice command, a user gesture, or a selection through a peripheral device, such as a mouse or a keyboard. As may be understood, the voice command may be received using the microphone 110, the user gesture may be received using the camera 108, and the input from the peripheral devices may be received using the I/O interfaces 106. On receiving the user request, the rendering unit 114 performs analytics based on the aforementioned information and provides the user with the analysis report. The analysis report may include at least a portion of the aforementioned information. As an example, the analysis report may include names of different users, their corresponding recorded viewing angles, their tags, their interests, most viewed portions, trending portions, and the like.

The aforementioned description describes how the system 100 makes use of the recorded viewing angles and information related to the view modes. The following description describes manner in which the information is provided to the user.

In an example, the rendering unit 114 provides the information pertaining to the one or more available view modes to the user when the user selects the 360-degree video for viewing. For instance, if different view modes are available for the 360-degree video, the rendering unit 114 provides the information related to the same to the user.

In an example, the rendering unit 114 may provide the information on the seek icon. In an example, the rendering unit 114 provides an icon/thumbnail/picture associated with the current view mode on the seek icon. In said example, when the user hovers the mouse over the seek icon or selects the seek icon, information associated with other view modes available at that seek mode is provided to the user, for instance, as a drop-down menu.

In another example, the rendering unit 114 provides the information on a seek bar of a media player through which the user is to view the 360-degree video. For instance, the rendering unit 114 may show different colors corresponding to different view modes on the seek bar. Furthermore, in said example, when the user hovers the mouse pointer over a portion of the seek bar, the rendering unit 114 may show further information associated with the view mode(s) for that portion. For instance, for a portion corresponding to user seek mode, when the user hovers the mouse over the portion, the rendering unit 114 may display a name of the user, a picture of the user, viewing angle information associated with the user's viewing of the 360-degree video and the like.

In yet another example, the rendering unit 114 provides the information through a menu of the media player. For instance, the rendering unit 114 may provide the available view modes, names of the users corresponding to the view modes, and the like, through the menu.

On viewing the information provided, in an example, the user may seek to select a view mode. Accordingly, in an example, the detection unit 118 receives a user input indicative of a selection of the view mode from the one or more available view modes. In an example, the user input may be one of a voice command, a user gesture, or a selection through a peripheral device, such as a mouse or a keyboard. As may be understood, the voice command may be received using the microphone 110, the user gesture may be received using the camera 108, and the input from the peripheral devices may be received using the I/O interfaces 106. The user input thus received, is received by the detection unit 118. In another example, the user input may be indicative of commands or instructions to change settings of the media player or view other options related to the 360-degree video. An example table 1, illustrating various user input types and corresponding actions is provided below.

Example Table 1

| User Input | Action |
| --- | --- |
| Single Click | Switch to DEFAULT view |
| Double Click | Display view selection option |
| Long Press | Visual representation of all the previous views of current user on the video seek bar |
| Voice Command - "Display View" | Display view selection option |
| Voice Command - "Switch Default" | Switch to DEFAULT view |
| Voice Command - "History" | Visual representation of all the previous views of current user, on the video seek bar |
| User Gesture - "thumbs up" | Switch to DEFAULT view |
| User Gesture - "thumbs down" | Display view selection option |
| Remote key press "abc" | Open user configurations settings |
| Remote keypress "xyz" | Open view filter option |

In an example, the detection unit 118 receives the selection of the view mode through the seek icon. For instance, the user may click on the seek icon and subsequently select a view mode. In another example, the user may hover the mouse over the seek icon and a drop-down menu including the available view modes is provided to the user. Accordingly, the user may select the view mode. In aforementioned examples, the selection of the view mode is received as a user input by the I/O interfaces 106. Subsequently, the detection unit 118 receives the selection of the view mode. In yet another example, the user may receive a toggling command on the seek icon. Based on the toggling command, the view mode is switched to one of a next available view mode or a previous view mode.

In an example, at the point of toggling, the rendering unit 114 provides information associated with at least two viewing options, that is, two view modes, for example, in the form of a graph.

In another example, the detection unit 118 receives the selection of the view mode through the menu option. For instance, the user may select a menu option. On selection, the user may be provided with information pertaining to the available view modes. Accordingly, the user may select the view mode from the menu.

In yet another example, the detection unit 118 receives the selection through the seek bar. For instance, the user may hover the mouse over the seek bar and may be presented with a drop-down menu including the available view modes. Accordingly, the user may select the view mode. Further, as described above, the detection unit 118 may receive the selection through user gestures or voice command as well.

The aforementioned description describes examples as to how the user may select the view mode for viewing the 360-degree video. In the example selections described above, the user input received for selection may be one of a voice command, a user gesture, or a user action, such as a mouse click or a keyboard input. Accordingly, based on the user input, the user input is received through one of the I/O interfaces 106, the camera 108, and the microphone 110.

In an example, the detection unit 118 may detect a video seek event to a seek point of the 360-degree video. For instance, the user may provide a mouse click on the seek bar for seeking to the seek point. The mouse click, in an example, is received by the I/O interfaces 106. In an example, the seek event may be a forward seek event, where the user seeks to a seek point ahead than a current seek point. In another example, the video seek event may be a backward seek event, where the user seeks to a seek point within a played time portion of the 360-degree video.

In an example, the detection unit 118 may receive the selection of the view mode before the video seek event. In said example, the user at firsts selects the view mode in which the user seeks to watch the 360-degree video. Post selection of the view mode, the user performs the seek activity. In a case where the user seeks to a seek point where no information associated with the view mode is available, the rendering unit 114 plays the 360-degree from the seek point in the default view mode.

In another example, the detection unit 118 may receive the selection of the view mode after the video seek event. In said example, the user performs the seek activity to the seek point. Subsequently, the rendering unit 114 provides the information pertaining to the available view modes at the seek point to the user. Thereafter, the user selects the view mode from the available view modes for viewing the 360-degree video.

As may be gathered, in an example, the user may perform both, the seeking activity and the view mode selection using the seek icon. In such a case, the detection unit 118 determines a user action on the seek icon as view mode selection if a current point of the seek icon and the seek point are within a predetermined threshold distance. For determining whether the current point of the seek icon is within the predetermined threshold distance of the seek point, the detection unit 118 makes use of position information. The position information may be understood as information indicative of coordinates of the user action on the seek icon. In an example, the position information is recorded by one of the I/O interfaces 106, the camera 108, and the microphone 110 when the user input or user selection is received. For instance, in a case where the user gives a voice command, the microphone 110, along with the processor 104, may record the position which the user is seeking. Similarly, the camera records the position information along with the processor 104. In an example, the position information is stored in the data storage unit 112.

In another case, the detection unit 118 determines the user action on the seek icon as a video seek event if the current point of the seek icon and the seek point are above a predetermined threshold distance. As mentioned above, the detection unit 118 makes the determination based on the position information recorded by one of the I/O interfaces 106, the camera 108, and the microphone 110. Thus, seeking activity and view mode selection are detected with accuracy.

In an example, the user may watch the 360-degree video without any seek activity and, may only change the view modes one or more times. In such a case, the user input received from the user may be referred to as a view-mode switch user input. Based on the view-mode switch user input, the rendering unit 114 switches a current view mode to a further view mode as selected by the user.

Thus, as described above, recording of the viewing angles and the metadata facilitates in providing multiple options of viewing the 360-degree to the user. Further, a manner in which the options are provided to the user, i.e., through the seek icon and the seek bar facilitates selection of different available view modes. For instance, as described above, the user may toggle between the different available view modes through a single action. As a result, overall user experience of viewing the 360-degree video is enhanced, as the user is easily able to select different view modes for viewing the 360-degree video.

Described below is an example use case where a user A watches a 360-degree video (3-minute long), hereinafter referred to as video ABC in said use case, and how the video ABC is rendered to the user by the system 100. In said use case, metadata associated with the video ABC is stored in the data storage unit 112 in an example database 2 (reproduced below).

For rendering the video ABC, the rendering unit 114 accesses the metadata associated with the video ABC stored in the example database 2. Based on the metadata, the rendering unit 114 ascertains the available view modes in which the user A may watch the video ABC. As per the metadata, the rendering unit 114 ascertains that default video mode, user-replay view mode, different user seek mode, user seek mode for a different time instance, trending view mode, and most viewed view mode are available for different time references of the video ABC. Further, the rendering unit 114 obtains the tags for the video ABC and learns about the user preferences, based on the metadata.

After analyzing the metadata, the rendering unit 114 begins rendering the video ABC to the user A. In an example, the user starts watching the video ABC as per the default view. While watching the video, the user A changes his view at 40 seconds. Thereafter, the user A changes his view at 1 minute 15 seconds, 1 minute 28 seconds, and at 2 minute 42 seconds, 2 minute 47 seconds. Thereafter, the user A continues to watch the video ABC until the end as per the viewing angle corresponding to time 2 minute 47 seconds. The change in the viewing angles is recorded by the recording unit 116 and is stored in the example database 2.

Example Database 2

| | | Video ABC | | | | | |
|---|---|---|---|---|---|---|---|
| | Viewing Angle of User | | | Metadata | | | |
| Time | A (x-y-z coordinates) | Date | Time | Session ID | View Mode | Available view modes | Tags Available | User preferences |
| 0:40 | +27 degree, +52 degree, +92 degree | Feb. 10, 2017 | 9:03 AM | S1 | Default mode | Default mode, most viewed mode | NO | Action movies, car chase scenes, |
| 1:15 | −42 degree, −117 degree, −212 degree | Feb. 10, 2017 | 10:29 AM | S1 | User seek mode | Different user seek mode, most viewed mode | NO | Animals, Animated movies |
| 1:28 | +130 degree, +57 degree, +127 degree | Feb. 10, 2017, Feb. 12, 2017 | 11:17 AM, 14:52 PM | S1, S2 | Different user seek mode, User seek mode | Different user seek mode, most viewed mode, trending view mode | YES | |
| 2:42 | +116 degree, +192 degree, +72 degree | Feb. 10, 2017, Feb. 14, 2017 | 15:03 PM, 17:40 PM | S1, S3 | User Seek mode | User seek mode, Different user seek mode, most viewed mode | NO | |
| 2:47 | −45 degree, −112 degree, −209 degree | Feb. 10, 2017, Feb. 12, 2017 | 18:01 PM, 17:03 PM | S1, S2 | User seek mode | Different user seek mode, most viewed mode, trending view mode | YES | |
| 3:00 | −45 degree, −112 degree, | Feb. 10, 2017 | 21:09 PM | S1 | User seek | Different user seek | YES | |

-continued

| | Video ABC | | | | | | |
|---|---|---|---|---|---|---|---|
| | Viewing Angle of User | | | Metadata | | | |
| Time | A (x-y-z coordinates) | Date | Time | Session ID | View Mode | Available view modes | Tags Available | User preferences |
| | −209 degree | | | | mode | mode, most viewed mode, user replay mode, user seek mode | | |

As can be seen from the example database 2, for each instance of viewing angle change, the recording unit 116 records the viewing angle of the user and a time at which the viewing angle is changed. Further, the recording unit 116 also records the viewing angle at the end of the video ABC. In an example, without limitation, the recording unit 116 records the viewing angle as per three-axis coordinate system.

During rendering of the video, the rendering unit 114 renders information based on the metadata to the user A. For instance, for each time reference for which different view modes are available, the rendering unit 114 provides the user A with options to select an available view mode. In an example, the rendering unit 114 renders the available view mode on a seek icon of a media player through which the user A is watching the video ABC. In an example, the rendering unit 114 may simultaneously provide the available view modes on a seek bar of the media player. In an example, the available view modes are provided as different color shades on the seek bar. In another example, a picture/thumbnail corresponding to each of the available view modes is provided to the user in a region of the media player near to the seek bar. In an example, both, different colors, and pictures/thumbnails are provided to the user on the seek bar.

On learning about the availability of different view modes, in an example, the user A may select a view mode from the available view modes. In an example, the user A may select the view mode using a mouse. For instance, the user A may hover the mouse over the seek icon. As a result, a drop down menu appears. The drop down menu includes a list of available view modes, in an example.

In another example, the user A may provide a voice command for selecting the view mode. On receiving the voice command, the system 100 displays a list of the available view modes to the user A. Subsequently, the user A may provide a further voice command for selecting the view mode from the available view modes.

In another example, the user A may provide a user gesture for selecting the view mode. For instance, the user A may perform a first predefined user gesture. On receiving the user gesture, the system 100 displays the list of available view modes. Subsequently, the user may perform a further user gesture for selecting the view mode from the list of available view modes.

On receiving the user selection of the available view mode, the rendering unit 114 obtains the viewing angle corresponding to the selected view mode and renders the video ABC to the user A. For instance, in said use case, the user A may select to view the video ABC in the different user seek mode. Accordingly, the rendering unit 114 obtains the viewing angle corresponding to the different user seek mode and renders the video ABC as per the viewing angle of the different user.

Thus, according to aspects of the present subject matter, viewing angles as per which the user A watches the video ABC are recorded. Further, multiple viewing options available for viewing the video ABC are provided to the user A.

As described in the foregoing description, the system 102 is implemented in the computing device 100. In another embodiment, the system 102 may be implemented in the server of the video service provider of 360-degree videos. Accordingly, one or more of the aforementioned modules/units of the system 102 are implemented in the server.

In the following paragraphs, non-limiting examples of the system 102 implemented in a distributed manner are being explained.

FIG. 1B illustrates an implementation of the system 102 in accordance with an embodiment of the present disclosure. As shown in the figure, the system 102 is implemented in a server 124 of a video service provider of 360-degree videos. In said embodiment, a user may watch the 360-degree videos using the computing device 100. For instance, using the computing device 100, the user may view a catalogue of the 360-degree videos hosted by the server 124 in the video database 126. Accordingly, the user may select a 360-degree video through a user input that may be a voice command, a user gesture, or a user action provided through a mouse or a keyboard. The user input is communicated to the server 124 by the communication unit 120. Based on the user selection of the movie, the server 124 starts a video feed to the computing device 100. In an example, the communication unit 120 may receive the video feed from the server 124.

In an example, the rendering unit 114 of the server 124 renders the 360-degree video to the computing device 100. In said example, the rendering unit 114 may, at first, access metadata related to the 360-degree video stored in the data storage unit 112-2. Upon accessing the metadata, the rendering unit 114 determines the available view modes in which the 360-degree video may be viewed. Accordingly, in an example, the rendering unit 114 provides the available view modes on at least one of a seek icon and a seek bar of a media player using which the user is watching the 360-degree video. As an example, when the user hovers the mouse over the seek icon, the rendering unit 114 provides a drop down menu listing the available view modes to the user. In another example, the rendering unit 114 provides the available view modes on the seek bar as thumbnails or as different color bands.

Furthermore, in an example, the recording unit 116 records the viewing angles in which the user watches the 360-degree video. Along with the viewing angles, the recording unit 116 records the metadata associated with the video. For instance, the recording unit 116 may record time references at which the user changes his viewing angle. Further, the recording unit 116 may record the view modes in which the user watches the 360-degree video. The recorded viewing angles and the metadata are stored in the data storage unit 112-2.

In an example, when the user watches that multiple viewing options are available, the user may provide a user selection indicative of a view mode in which the user wishes to watch the 360-degree video. In an example, the detection unit 118 receives user selection of an available view mode from the available view modes presented to the user.

Based on the received user selection, the rendering unit 114 renders the 360-degree video in the selected view mode. In an example, the rendering unit 114 is to play the 360-degree video based on one of a recorded viewing angle and the view mode. On receiving the selection of the view mode, the rendering unit 114 again accesses the metadata related to the 360-degree video. Based on the metadata, the rendering unit 114 determines the viewing angle corresponding to the selected view mode. On determining the viewing angle corresponding to the selected view mode, the rendering unit 114 renders the 360-degree video as per the determined viewing angle.

In an example, the received video feed is provided to the user through a display unit 128. Further, the system may operate in a manner as described above in FIG. 1A.

FIGS. 2 and 3 illustrate exemplary methods 200 and 300, according to embodiments of the present disclosure. The order in which the methods 200 and 300 are described is not to be construed as a limitation, and any number of the described method blocks can be combined in any order to implement the methods 200 and 300 or an alternative method. Additionally, individual blocks may be deleted from the methods 200 and 300 without departing from the scope of the subject matter described herein. Furthermore, the methods 200 and 300 can be implemented in any suitable hardware, software, firmware, or combination thereof.

Referring to FIG. 2, at step 202, a 360-degree video is played. In an example, a user may play the 360-degree video using a computing device, such as the computing device 100. Examples of the computing device may include, but are not limited to, a tablet, a VR headset, a smartphone, a desktop computer, and the like. In an example, the rendering unit 114 may play the 360-degree video.

At step 204, one or more viewing angles corresponding to a user's viewing of the 360-degree video are recorded. In an example, the user may change his viewing angles multiple times to watch the 360-degree video from different directions. The viewing angles are recorded and stored, for example, in a storage unit. The recorded viewing angles are subsequently used for generating statistical analysis for the 360-degree video. Further, the recorded viewing angles may be associated with one or more view modes, as described above. In an example, the recording unit 116 records the viewing angles corresponding to the user's viewing of the 360-degree video.

In an example, while watching the 360-degree video, the user may select any of one or more available view modes for watching the 360-degree video as per the selected view modes.

At step 206, a video seek event to a seek point of the 360-degree video is detected. The video seek event may be a forward seek event. For instance, the user may seek to a seek point farther than a current playing point. In another example, the seek event may be a backward seek event. That is, the user may seek to a seek point within a played time portion of the 360-degree video.

For performing the seek event, the user may provide a user input. In a case where the user input is within a predefined threshold, the user input may be detected as an input for changing a view mode for playing the 360-degree video. In another example where the user input is outside the predefined threshold, the user input may be detected as an input for seeking.

In an example, the selection of the view mode is received before the seek event. For instance, the user may first select a view mode and then seek in the selected view mode. In another example, the selection of the view mode is received after the seek event. For instance, the user may first perform the seek event and subsequently select a view mode after seeking.

At step 208, the 360-degree video is played from the seek point according to a viewing angle determined based on at least one of a recorded viewing angle and a view mode.

In an example, for playing the 360-degree video, metadata associated with the 360-degree is fetched. The metadata, in an example, includes information related to different users who have seen the video. For instance, the metadata may include viewing angles corresponding to the viewing of the 360-degree video by different users. Accordingly, the metadata also includes different view modes that are available for viewing the video.

Now, when the user selects a particular view mode for viewing the 360-degree video, viewing angles corresponding to the selected view mode are obtained from the metadata. Thereafter, the 360-degree video is played based on the obtained viewing angles corresponding to the selected video.

Referring to FIG. 3, steps 302 is analogous to step 202, and is performed in a manner as described above. At step 304, selection of a view mode from one or more available view modes using a seek icon and, a video seek event to a seek point of the 360-degree video are detected. In an example, the user may provide a user input for selecting the view mode from the available view modes using the seek icon. Examples of the user input may include, a mouse input, a keyboard input, a voice command input, and a user gesture input. In another example, the video seek event is detected. The seek event may be a forward seek event or a backward seek event, as described above.

In an example, the selection of the view mode may be performed prior to the seek event. In another example, the selection of the view mode is performed after the seek event.

At step 306, the 360-degree video from the seek point according to a viewing angle corresponding to the selected view mode. On detecting the selection of the view mode, recorded viewing angles corresponding to the view mode are obtained and the 360-degree video is played accordingly.

Referring to FIG. 4, at step 402, a 360-degree video is played. In an example, a user may watch the 360-degree video using a computing device, such as a laptop, a desktop computer, a tablet, a VR headset, and the like. In an example, the 360-degree video is stored in an internal storage of the computing device. In another example, the 360-degree video is hosted by a server of a video service provider. In an example, the rendering unit 114 may play the 360-degree video.

At step 404, information pertaining to one or more available view modes for playing the 360° video from a seek point is provided to the user. In an example, the view modes may include a default view mode, a user seek mode, a different user seek mode, a most viewed mode, a trending view mode, a user replay view mode, and an interest view mode.

In an example, the information may include a color band corresponding to a view mode. In another example, the information may include a thumbnail/picture/icon corresponding to the view mode.

Further, in an example, the information may be provided through a seek icon of a media player using which the user is watching the 360-degree video. In said example, when the user hovers the mouse over the seek icon, a list of available view modes is presented to the user. In another example, the information is provided to the user using a seek bar of the media player. In said example, the color bands and/or the picture/thumbnail/icon are provided on or in a region near to the seek bar. In yet another example, the information may be provided through a menu option of the media player. In an example, the rendering unit 114 provides the information pertaining to the one or more available view modes.

At step 406, a user input indicative of a selection of the view mode from the one or more available view modes is received from the user. In an example, the detection unit 118 may receive the user input.

In an example, the user input is a voice command. For instance, a microphone of the computing device may receive the voice command from the user. In another example, the user input is a user gesture. In said example, a camera of the computing device receives the user input from the user. In yet another example, the user input is a user action performed through a mouse or a keyboard. For instance, a toggle command may be received. In said example, the user input is received through I/O interfaces of the computing device.

In an example, the user selection is received before a video seek event. In said example, the user at firsts selects the view mode and subsequently performs a seek action to a seek point on the seek bar. In another example, the user selection is received after a video seek event. In said example, the user at first seeks to the seek point. Subsequently, the user selects the view mode from a list of available view modes at the seek point.

Referring to FIG. 5, at step 502, a user action on a seek icon is received. In an example, the detection unit 118 receives the user action. In an example, a user may watch a 360-degree video using a computing device. The computing device plays the 360-degree video using a media player. The media player may be a standalone application or may be provided as in an embedded form in a browser application installed on the computing device. While watching the video, the user may seek to change a view mode of watching the 360-degree video or may wish to seek to a seek point on a seek bar of the media player. To that end, the user may provide the user action on the seek icon.

In an example, the user action is received as a mouse input or a keyboard input, for example, using I/O interfaces of the computing device. In another example, the user action may be a voice command and is received using a microphone of the computing device. In said example, the computing device learns about the precise coordinates of the user action based on the time reference mentioned in the voice command.

In yet another example, the user action may be a user gesture received through a camera of the computing device. In said example, the user gesture may correspond to the user action on the seek bar. For instance, the user may perform a tap action using his finger and said action may correspond to a click on/around the seek icon.

At step 504, a current point of the seek icon and a sought point are compared. In an example, the detection unit 118 is to compare the current point of the seek icon and the sought point. At step 506, the user action is determined as one of a video seek event and a view mode selection based on the comparison. In an example, if a distance between the current point and the seek point is less than the predetermined threshold, it is determined that the user action is related to the view mode selection.

In another example, where it is determined that the distance between the current point and the seek point is more than the predetermined threshold, it is determined that the user action is related to the video seek event. In an example, the detection unit 118 is to determine the user action as one of the video seek event and the view mode selection.

FIG. 6A illustrates a video frame 600-1 of a 360-degree video according to an embodiment of the present disclosure. In an example, a user may start watching the 360-degree video as per a default view. An icon 602-1 corresponding to the default view is also shown on a seek bar 604 in the figure. Further, as shown in the figure, the user continues watching the 360-degree video in the default view until 19th second of the 360-degree video.

FIG. 6B illustrates a video frame 600-2 of the 360-degree video according to an embodiment of the present disclosure. In an example, the user may change his/her viewing angle. In said example, when the user changes the viewing angle, an icon 602-2 corresponding to a user view of the user is shown on the seek bar 604 in the video frame 600-2. As shown in the figure, the user continues to watch the video as per the user view at 1 minute and 28th second of the 360-degree video.

FIG. 6C a video frame 600-3 of the 360-degree video according to an embodiment of the present disclosure. As shown in the figure, the user is at 2 minutes 20th second of the 360-degree video and is watching the 360-degree video as per the user view. Now, the user wants to do a backward seek. In an example, the user may do the backward seek to 1:28 min of the 360-degree video in the user view mode. In said example, the user simply points the mouse over to the 1:28 minute and clicks the mouse. Accordingly, a video frame as shown in FIG. 6D is shown to the user.

FIG. 6D illustrates a video frame 600-4 of the 360-degree video according to an embodiment of the present disclosure. The video frame 600-4 is identical to the video frame 600-2 and shows the 360-degree video as per the user view to the user.

In another example, the user may do the backward seek to 1:28 min of the 360-degree video in the default view mode. In said example, the user at first provides a user input to switch to the default view. Thus, the view at 2:20 changes to the default view, as shown in figure E. FIG. 6E illustrates a video frame 600-5 of the 360-degree video according to an embodiment of the present disclosure. The video frame 600-5 shows the 2:20 min of the 360-degree video as per the default view.

After changing the view at 2:20 min to the default view, the user may now seek to 1:28th minute of the video in the default view mode, as illustrated in FIG. 6F. FIG. 6F illustrates a video frame 600-6 of the 360-degree video according to an embodiment of the present disclosure. The video frame 600-6 shows the 1:28th minute of the 360-degree video in the default view.

FIG. 6G illustrates a video frame 600-7 of the 360-degree video according to an embodiment of the present disclosure.

In an example, if the user is in the user view mode and seeks to a seek point where the user view mode is not available, the 360-degree video is rendered in the default view. Consider an example where the user is in the user view mode at 2:20 min (as shown in FIG. 6C) of the video and the user seeks to 0:19 min of the video. Now, as described previously, the user did not watch the 360-degree video in the user view mode at 0:19 minute. Thus, as shown in the video frame 600-7, the user is shown a view as per the default view.

FIG. 7 illustrates a plurality of view modes 700 and notations 702 corresponding to the view modes 700. As an example, a notation 702-1 corresponds to a default view 700-1. As shown in the figure, a view mode may be represented using different notations. For instance, a user view 700-2 is represented using notations 702-2, 702-3, and 702-4, where 702-2 is an icon, 702-3 is an image, and 702-4 is another icon (bubble icon).

FIG. 8 illustrates a use case 800, according to an embodiment of the present disclosure. In the use case 800, a user A is watching a 360-degree video. While watching the 360-degree video, the user A may change his/her viewing angles multiple times. In an example, the user A may happen to like a scene as per the viewing angle at time t2. Accordingly, the user A may tag the scene at time t2. After tagging the scene, the user A continues to watch the video, say in the default view. Now, in an example, when the user A wants to refer back to the scene tagged at time t2, the user A points the mouse at time t2 and options 802 including one or more available view modes for playing the 360-degree video at time t2 are provided to the user. As shown in the figure, the options 802 include an option to view the 360-degree video in a default view, in a user view, and the tagged view. Accordingly, the user A may select to view the 360-degree video as per the tagged view. Thus, the user experience of watching the 360-degree video is enhanced.

FIG. 9 illustrates a use case 900, according to an embodiment of the present disclosure. In the use case 900, a user is watching a 360-degree video, say for the third time. As shown in the figure, the user is at time to and wishes to seek to a time tn-x. As the user has watched the 360-degree video previously, when the user seeks to the seek point at tn-x, the user is provided with options 902 to view the 360-degree. The options 902, in an example, may include one or more timelines 904-1 to 904-3 illustrating various viewing angles corresponding to previous viewing sessions of the 360-degree video by the user. In an example, the timeline 904-1 corresponds to a first viewing session of the 360-degree video by the user. Similarly, the timeline 904-2 corresponds to a second viewing session, for example, a viewing of the 360-degree video as per the default view. Further, the timeline 904-3 corresponds to a third viewing session of the 360-degree video by the user. In an example, the user may provide a user input 906, for example, a mouse click, for viewing the 360-degree video as per the third viewing session.

FIG. 10 illustrates a use case 1000, according to an embodiment of the present disclosure. In the use case 1000, interest based notifications are provided to users watching the 360-degree video. Consider an example where both, a user A and his father user B have common interest of watching 360-degree horror videos. In said case, suppose the user B watches a 360-degree horror video, in which one or more key scenes are marked. During playing of the 360-degree horror video, the user B is provided with notifications whenever a key scene is about to come. In an example, the user B himself may add "key scene" tags to scenes which are appealing to the user B. Now whenever the user A starts watching the 360-degree horror video, in addition to the default key scenes, the key scenes tagged by the user A may be presented to the user. Accordingly, an example notification 1002 indicating that "key" scene is about to come is provided to the user A. In an example, if the user A is already in the viewing angle of the user B, no notification may be provided.

In an example, when the user A clicks on the notification 1002, the viewing angle is changed as per the tagged viewing angle. In an example, one or more filter options 1004 are provided to the user A. The filter options 1004 facilitate the user A in selecting notifications as per his choice. For instance, say, seven people have seen the 360-degree horror video. Now, the user A may choose to view notifications corresponding to only three of the seven users. Accordingly, the user A may turn off the notifications for other four users.

FIG. 11 illustrates a use case 1100, according to an embodiment of the present disclosure. In said use case 1100 statistical analysis with respect to a 360-degree video are provided to a user. Consider an example where a user A is an innovator and, works on innovative next generations products. In an example, the user A has made a 360-degree video of his/her product seeks to get feedback from a pool of experimental buyers. Accordingly, the user A shared the 360-degree video with the pool of buyers and, asks them to tag portions of the 360-degree video that they liked or simply view the 360-degree video (viewing activity, such as viewing angles and user actions are recorded). As instructed, the experimental buyers tag different portions of the 360-degree video based on their personal preferences or in another case, simply watch the 360-degree video. In said example, once all the experimental buyers have seen the 360-degree video, the user A may provide a user input for generating the statistical analysis with respect to the 360-degree video. In response to the user input, detailed statistics of what the experimental buyers have liked is presented to the user as a statistical report 1102. Further, the user A is provided with filtering options 1104 to filter out one or more experimental buyers. Furthermore, in an example, the user A may provide a user input 1106, for example, a click to jump to a viewing angle corresponding to an experimental buyer. Thus, this sort of insight really helps the user A to work effectively on the product and improve it.

FIG. 12 illustrates a use case 1200, according to an embodiment of the present disclosure. In the use case 1200, a user A may view a 360-degree video in the different user seek mode. For instance, the user A watches action movies, while user A's children watch a lot of 360-degree educational video. In an example, the user A decides to watch a 360-degree educational video that user A's children usually watch. After watching for a while, the user A seeks to check what the children have watched. In an example, when the user A chooses to see what the children have watched at time t2, information corresponding to the children's watching of the 360-degree educational video at time t2 is provided to the user via options 1202-1, 1202-2, 젠, and 1202-N. Further, the user A is provided with filtering options 1204 to filter out one or more of the children.

FIG. 13 illustrates a graphical user interface (GUI) of a seek bar 1300 according to an embodiment of the present disclosure. In an example, the seek bar 1300 includes colors 1302 corresponding to a plurality of available view modes, media control options 1304, and indicators 1306 corresponding to a plurality of users who have watched a same 360-degree video.

FIG. 14 illustrates a drop-down menu 1400. The drop-down menu 1400 provides the user with options 1402-1 to 1402-N for selecting an available view mode for playing a 360-degree video. In an example, the drop-down menu 1400 may be provided through a seek icon. In another example, the drop-down menu 1400 may be provided through a seek bar.

FIG. 15 illustrates a use case in accordance with an embodiment of the present disclosure. In said use case the user is watching a 360-degree video in a default view and seeks to change a view mode by toggling using a seek icon. As shown in GUI 1500 of the figure, a user may provide a user input 1502, for example, a touch input, on a seek icon 1504. In response to the user input 1502, the view mode changes from a default view mode 1506, as shown in the GUI 1500, to a user seek view mode 1508, as shown in a GUI 1510. As shown in the GUI, the seek icon 1504 changes to seek icon 1512, corresponding to the user seek view mode.

FIG. 16 illustrates user activity of a user for playing a 360-degree video in accordance with an embodiment of the present disclosure. In an example, the user activity may include providing a user input for changing a view mode in which the 360-degree video is playing. In said example, if the user input is within a predefined threshold region 1600 corresponding to a seek icon 1602, the user input is taken as an input to change the view mode. Accordingly, the user is provided with a menu 1604 for selecting a view mode from one or more available view modes.

In another example, the user activity may include providing a user input to perform a seek activity to a seek point 1606 on a seek bar 1608. In said example, the user input is detected as a seek activity if the user input is outside the predefined threshold region 1600.

FIG. 17 illustrates a use case 1700 whereby a user A seeks to change viewing angle while watching a 360-degree video. In the FIG. 17, a video frame 1702 of the 360-degree video is shown. In the use case, the user A may seek to change viewing angle using a seek icon 1704 provided on a seek bar 1706. In said case, the user A may use a mouse pointer 1708 to point over the seek icon 1704. In response, a drop down menu 1710 is presented to the user A, as shown in the figure. In an example, the drop down menu 1710 includes information related to viewing angle information corresponding to different users (B to F) who have viewed the video in the past. Accordingly, the user A may select to view the 360-degree video as per a viewing angle of any of the different users (B to F). As shown in the FIG. 17, the user A selects to view the 360-degree video as per the viewing angle of user D. Accordingly, the 360-degree video is played as per the viewing angle of the user D.

FIG. 18 shows a use case 1800. IN said use case, a user 1802 watching a 360-degree video performs a seek action using a voice seek command. As shown in the figure, the user 1802 is watching the 360-degree video using a smartphone 1804. Further, as shown in the figure, the user is watching a video frame 1806 corresponding to time reference 32:17 minute of a 52:19 minute long video.

In said use case, multiple options 1808 of viewing the 360-degree video as per different view modes are provided to the user on a seek bar 1810. For instance, 1808-1 may correspond to a most viewed mode, 1808-2 may correspond to a different user seek mode, and 1808-3 may correspond to a trending view mode.

Further, in said use case, a current seek point is shown by the seek icon 1812. In said use case, the user 1802 provides a voice command 1814, for example, "seek to 38:41", for seeking to a different seek point on the seek bar 1810. Based on the voice command, the seek action is performed and the 360-degree video seeks to time reference 38:41 minute. The same is illustrated in FIG. 19.

FIG. 19 shows a use case 1900. In said use case, a user 1902 watching a 360-degree video performs a seek action using a voice seek command. As shown in the figure, the user 1902 is watching the 360-degree video using a laptop 1904. Further, as shown in the figure, the user is watching a video frame 1906 corresponding to time reference 38:41 minute of a 52:19 minute long video.

In said use case, multiple options 1908 of viewing the 360-degree video as per different view modes are provided to the user on a seek bar 1910. For instance, 1908-1 may correspond to a different user seek mode, 1908-2 may correspond to a trending view mode, and 1908-3 may correspond to a user-replay view mode. Further, in said use case, a current seek point is shown by the seek icon 1912.

In said use case, the user 1902 provides a user gesture 1914, for example, a hand movement to view a list of available view modes. Based on the user gesture 1914, a list 1916 of view modes is shown to the user 1902. As shown in the list 1916, the user is provided with options to view the 360-degree video as per the different user seek mode, the trending view mode, and the user-replay view mode. The user-replay view mode corresponds to the user 1902.

Consider an example where the user selects to view the 360-degree video as per the user-replay view mode. In said case, metadata associated with the 360-degree video is accessed and accordingly, viewing angle information corresponding to the user-replay view mode is fetched. The viewing angle information corresponding to the user-replay view mode includes viewing angles as per which the user has seen the 360-degree video in the past. In addition, user actions with respect to the v360-degree video are also obtained from the metadata. The user actions may include seek events, zoom actions, video playback settings, user replays, performed by the user 1902, performed by the user during previous viewing of the 360-degree video by the user 1902.

Subsequently, the 360-degree video is rendered to the user 1902 per the viewing angle information and the user actions obtained from the metadata related to the video.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for playing a 360-degree video by a media player, the method comprising:
   playing, by the media player, the 360-degree video;
   detecting, by the media player, a selection of a view mode from one or more available view modes based on a toggle command on a seek icon and a video seek event to a seek point of the 360-degree video; and
   playing, by the media player, the 360-degree video from the seek point according to a viewing angle determined based on the selected view mode, wherein the video seek event pertains to the seek point within a played time portion of the 360-degree video, wherein the selection of the view mode is detected if a current point of the seek icon and the seek point are within a predetermined threshold distance, wherein the video seek event is detected if the current point of the seek icon and the seek point are above the predetermined threshold distance.

2. The method of claim 1, further comprising:

recording, by the media player, one or more viewing angles corresponding to a user's viewing of the 360-degree video; and providing information pertaining to the one or more available view modes for playing the 360-degree video from the seek point to the user.

3. The method of claim 2, wherein the information pertaining to the one or more available view modes is presented on the seek icon, wherein information pertaining to the one or more available view modes is presented on a seek bar, and wherein each of the one or more available view modes is associated with a different viewing angle.

4. The method of claim 1, further comprising providing information pertaining to at least two stored viewing options at a point of toggling.

5. The method of claim 1, further comprising displaying a seek bar on the media player, the seek bar comprising one or more indicators corresponding to one or more available view modes for playing the 360-degree video.

6. The method of claim 1, further comprising:

receiving a view-mode-switch user input; and switching from a current view mode to a further view mode based on the view-mode-switch user input.

7. The method of claim 1, wherein the view mode is one of: a default view mode; an interest based view mode; a user replay view mode; a user seek mode; a different user seek mode; a most viewed mode; and a trending view mode.

8. The method of claim 1, further comprising receiving the selection of the view mode based on the toggle command on the seek icon before the video seek event; or receiving the selection of the view mode based on the toggle command on the seek icon after the video seek event.

9. An apparatus for playing a 360-degree video, the apparatus comprising:

at least one processor;

a memory containing instructions, that when executed by the at least one processor, cause the apparatus to:

play the 360-degree video;

detect a selection of a view mode from one or more available view modes based on a toggle command on a seek icon and a video seek event to a seek point of the 360-degree video; and play the 360-degree video from the seek point according to a viewing angle determined based on the selected view mode, wherein the video seek event pertains to the seek point within a played time portion of the 360-degree video, wherein the selection of the view mode is detected if a current point of the seek icon and the seek point are within a predetermined threshold distance, wherein the video seek event is detected if the current point of the seek icon and the seek point are above the predetermined threshold distance.

10. The apparatus of claim 9, wherein the memory further comprises instructions, that, when executed by the at least one processor, cause the apparatus to:

record one or more viewing angles corresponding to a user's viewing of the 360-degree video; and provide information pertaining to the one or more available view modes for playing the 360-degree video from the seek point to the user.

11. The apparatus of claim 10, wherein the information pertaining to the one or more available view modes is presented on the seek icon, wherein information pertaining to the one or more available view modes is presented on a seek bar, and wherein each of the one or more available view modes is associated with a different viewing angle.

12. The apparatus of claim 9, wherein the memory further comprises instructions, that when executed by the at least one processor, cause the apparatus to provide information pertaining to at least two stored viewing options at a point of toggling.

13. The apparatus of claim 9, wherein the memory further comprises instructions, that when executed by the at least one processor, cause the apparatus to display a seek bar on the apparatus, the seek bar comprising one or more indicators corresponding to one or more available view modes for playing the 360-degree video.

14. The apparatus of claim 9, memory further comprises instructions, that when executed by the at least one processor, cause the apparatus to:

receive a view mode-switch user input; and switch from a current view mode to a further view mode based on the view mode-switch user input.

15. The apparatus of claim 9, wherein the view mode is one of: a default view mode; an interest based view mode; a user replay view mode; a user seek mode; a different user seek mode; a most viewed mode; and a trending view mode.

16. The apparatus of claim 9, wherein the memory further comprises instructions, that when executed by the at least one processor, cause the apparatus to:

receive the selection of the view mode based on the toggle command on the seek icon before the video seek event; or receive the selection of the view mode based on the toggle command on the seek icon after the video seek event.

\* \* \* \* \*